(12) United States Patent
Sinharoy et al.

(10) Patent No.: US 10,783,668 B2
(45) Date of Patent: Sep. 22, 2020

(54) HANDLING DUPLICATE POINTS IN POINT CLOUD COMPRESSION

(71) Applicant: Samsung Electronics Co., Ltd., Suwon-si, Gyeonggi-do (KR)

(72) Inventors: Indranil Sinharoy, Richardson, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/219,433

(22) Filed: Dec. 13, 2018

(65) Prior Publication Data

US 2019/0197739 A1    Jun. 27, 2019

Related U.S. Application Data

(60) Provisional application No. 62/609,716, filed on Dec. 22, 2017, provisional application No. 62/743,044, filed on Oct. 9, 2018, provisional application No. 62/774,487, filed on Dec. 3, 2018.

(51) Int. Cl.
| | |
|---|---|
| *G06K 9/00* | (2006.01) |
| *G06T 9/00* | (2006.01) |
| *G06T 3/40* | (2006.01) |
| *G06T 7/55* | (2017.01) |
| *G06K 9/62* | (2006.01) |

(52) U.S. Cl.
CPC ............ *G06T 9/00* (2013.01); *G06K 9/00711* (2013.01); *G06K 9/6218* (2013.01); *G06T 3/4007* (2013.01); *G06T 7/55* (2017.01); *G06T 2207/10028* (2013.01); *G06T 2207/20224* (2013.01)

(58) Field of Classification Search
None
See application file for complete search history.

(56) References Cited

U.S. PATENT DOCUMENTS

| | | |
|---|---|---|
| 9,858,640 B1 | 1/2018 | Earl et al. |
| 2007/0255758 A1 | 11/2007 | Zheng et al. |
| 2010/0085353 A1 | 4/2010 | Zhou et al. |

(Continued)

OTHER PUBLICATIONS

He et al., "Best-effort projection based attribute compression for 3D point cloud", 2017 23rd APCC, Dec. 11, 2017 (Year: 2017).*

(Continued)

*Primary Examiner* — Soo Jin Park

(57) ABSTRACT

A decoder, an encoder and a method for decoding 3D point cloud data. The decoder includes a communication interface configured to receive an encoded bit stream comprising the 3D point cloud data and a processor. The processor is configured to decode the bit stream to identify a plurality of 2D frames; identify corresponding pixels in two or more geometry frames in the plurality of 2D frames based on locations of the corresponding pixels in the two or more geometry frames; identify depth values of the corresponding pixels in the two or more geometry frames; identify duplicate points in at least one of the two or more geometry frames based on the identified depth values of the corresponding pixels in the two or more geometry frames; and remove or ignore the identified duplicate points while reconstructing the 3D point cloud data.

20 Claims, 10 Drawing Sheets

(56) References Cited

U.S. PATENT DOCUMENTS

| | | |
|---|---|---|
| 2013/0223702 A1 | 8/2013 | Holsing et al. |
| 2014/0307952 A1 | 10/2014 | Sweeney et al. |
| 2015/0029186 A1 | 1/2015 | Pope |
| 2017/0228940 A1 | 8/2017 | Kutliroff |
| 2017/0243352 A1 | 8/2017 | Kutliroff et al. |
| 2018/0268570 A1* | 9/2018 | Budagavi ................ G06T 9/001 |
| 2019/0087978 A1* | 3/2019 | Tourapis .................. G06T 9/00 |
| 2019/0087979 A1* | 3/2019 | Mammou ............... G06T 9/004 |

OTHER PUBLICATIONS

ISA/KR, "International Search Report and Written Opinion of the International Search Authority," International Application No. PCT/KR2018/016336, dated May 14, 2019, 8 pages.

Castro, Daniel Herrera, "From Images to Point Clouds," Doctoral Dissertation, Oulu: University of Oulu, Aug. 4, 2015, 111 pages.

Kammerl, Julius, et al., "Real-time Compression of Point Cloud Streams," 2012 IEEE International Conference on Robotics and Automation, Saint Paul, Minnesota, USA, May 14-18, 2012, 10 pages.

Pavez, Eduardo, et al., "Dynamic Polygon Cloud Compression," 2017 IEEE International Conference on Acoustics, Speech and Signal Processing (ICASSP), May 5-9, 2017, 7 pages.

Whelan et al., "Kintinuous: Spatially Extended KinectFusion", Computer Science and Artificial Intelligence Laboratory Technical Report, MIT-CSAIL-TR-2012-020, Jul. 2012, 10 pages.

Zhou et al., "Data-Parallel Octrees for Surface Reconstruction" IEEE Transactions on Visualization and Computer Graphics, vol. 17, No. 5, May 2011, pp. 669-681.

\* cited by examiner

HANDLING DUPLICATE POINTS IN POINT CLOUD COMPRESSION

CROSS-REFERENCE TO RELATED APPLICATION AND CLAIM OF PRIORITY

This application claims priority under 35 U.S.C. § 119(e) to U.S. Provisional Patent Application No. 62/609,716 filed Dec. 22, 2017; U.S. Provisional Patent Application No. 62/743,044 filed Oct. 9, 2018; and U.S. Provisional Patent Application No. 62/774,487 filed Dec. 3, 2018. The above-identified provisional patent applications are hereby incorporated by reference in their entirety.

TECHNICAL FIELD

This disclosure relates generally to point cloud compression of three dimensional (3D) objects. More specifically, this disclosure relates to handling duplicate points in point cloud compression.

BACKGROUND

Three hundred sixty-degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. Six Degrees of Freedom (6DoF) is the next level of immersive experience where in the user can turn his head as well as move around in a virtual/augmented environment. Multimedia data that is 3D in nature, such as point clouds, is needed to provide 6DoF experience.

Point clouds and meshes are a set of 3D points that represent a model of a surface of 3D objects. Point clouds are common in a variety of applications such as gaming, 3D maps, visualizations, medical applications, augmented reality, virtual reality, autonomous driving, multi-view replay, 6DoF immersive media, to name a few. However, point clouds are composed of large amounts data, which require compression.

SUMMARY

This disclosure provides for the handling of duplicate points in point cloud compression.

In one embodiment, a decoder for decoding 3D point cloud data is provided. The decoder includes a communication interface configured to receive an encoded bit stream comprising the 3D point cloud data and a processor. The processor is configured to decode the bit stream to identify a plurality of 2D frames; identify corresponding pixels in two or more geometry frames in the plurality of 2D frames based on locations of the corresponding pixels in the two or more geometry frames; identify depth values of the corresponding pixels in the two or more geometry frames; identify duplicate points in at least one of the two or more geometry frames based on the identified depth values of the corresponding pixels in the two or more geometry frames; and remove or ignore the identified duplicate points while reconstructing the 3D point cloud data.

In another embodiment, an encoder for encoding 3D point cloud data is provided. The encoder includes a processor and a communication interface. The processor is configured to encode a first set of 2D frames for the 3D point cloud data into an encoded bitstream; and perform prediction on the first set of 2D frames to encode a second set of 2D frames for the 3D point cloud data into the encoded bitstream. To perform the prediction the processor is further configured to decode the bit stream to generate a plurality of 2D frames; identify corresponding pixels in two or more geometry frames in the plurality of 2D frames based on locations of the corresponding pixels in the two or more geometry frames; identify depth values of the corresponding pixels in the two or more geometry frames; identify duplicate points in at least one of the two or more geometry frames based on the identified depth values of the corresponding pixels in the two or more geometry frames; and remove or ignore the identified duplicate points while reconstructing the 3D point cloud data. The communication interface is configured to transmit the encoded bit stream comprising the 3D point cloud data.

In another embodiment, a method for decoding 3D point cloud data is provided. The method includes receiving an encoded bit stream comprising the 3D point cloud data; decoding the bit stream to identify a plurality of 2D frames; identifying corresponding pixels in two or more geometry frames in the plurality of 2D frames based on locations of the corresponding pixels in the two or more geometry frames; identifying depth values of the corresponding pixels in the two or more geometry frames; identifying duplicate points in at least one of the two or more geometry frames based on the identified depth values of the corresponding pixels in the two or more geometry frames; and removing or ignoring the identified duplicate points while reconstructing the 3D point cloud data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure recognize that decoding and rendering point cloud data, such as 3D objects can be costly in terms of the resources consumed. For example, processing and memory resources may be heavily used while reconstructing a point cloud. Embodiments of the present disclosure provide improvements to point cloud compression such as video based point clout compression (V-PCC) by the Moving Picture Experts Group (MPEG), by reducing the number of redundant and duplicate vertices generated, which in turn, may also reduce the codec complexity.

Embodiments of the present disclosure provide solutions to reduce complexity of point clouds. Embodiments of the present disclosure recognize that while certain point cloud encoding techniques may perform well in both objective and visual tests, they may generate significantly more points in the decoded point cloud than there are in the original (source) point cloud. In addition, embodiments of the present disclosure recognize that some encoding techniques may generate a large percentage of points that are duplicates, which add to the codec complexity.

Accordingly, embodiments of the present disclosure identify two sources of point duplications and provide solutions to reduce the number of redundant and duplicate points. Additionally, various embodiments provide for such reductions without degrading the visual quality of the reconstructed point cloud.

Figure 1:
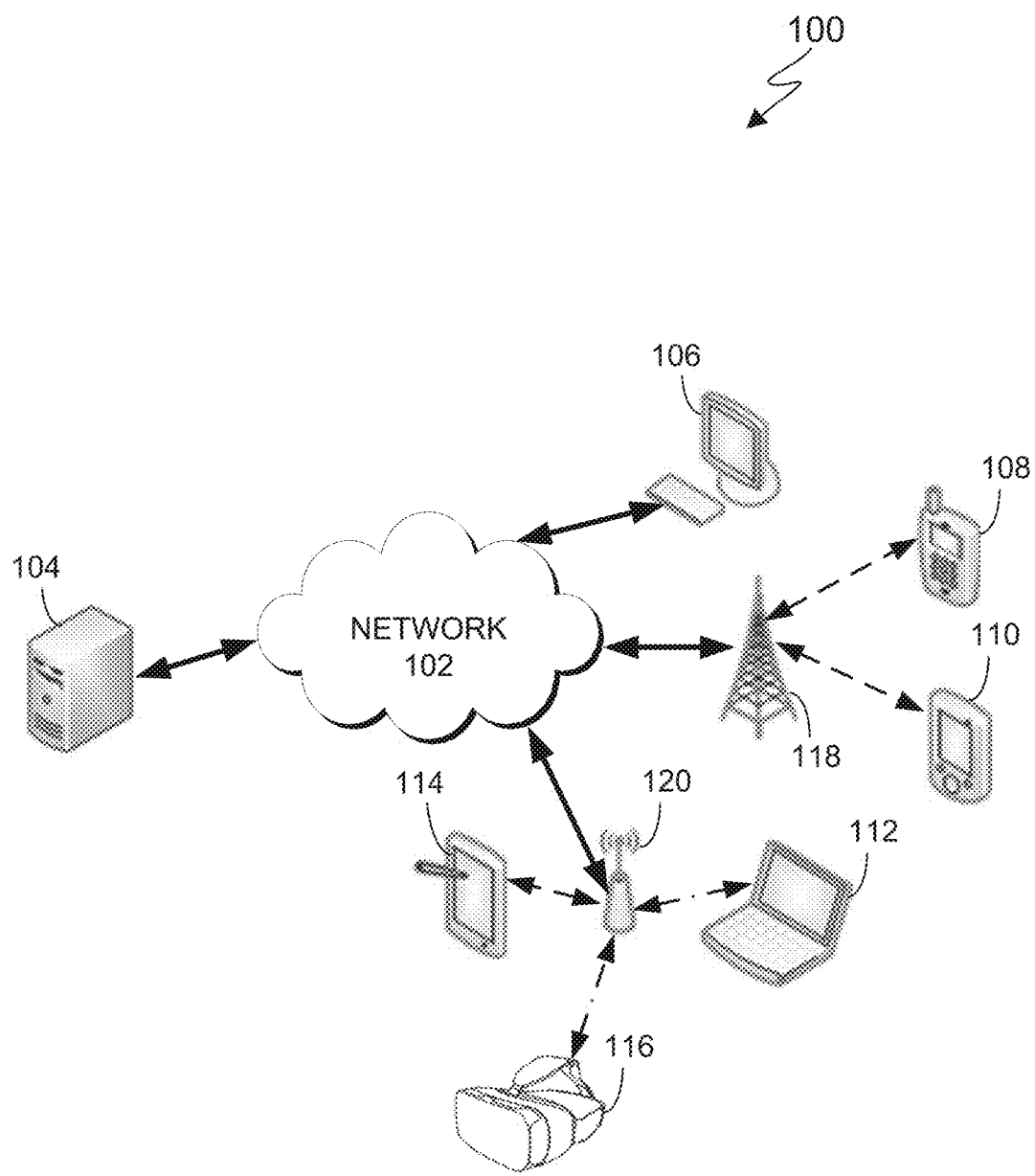
FIG. 1 illustrates an example computing system according to this disclosure.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-116. The client devices 106-116 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 may encode or decode a point cloud to handle duplicate points. In various embodiments, each server 104 can include an encoder for handling duplicate points in point cloud compression.

Each client device 106-116 represents any suitable computing or processing device that interacts with at least one server or other computing device(s) over the network 102. In this example, the client devices 106-116 include a desktop computer 106, a mobile telephone or mobile device 108 (such as a smartphone), a personal digital assistant (PDA) 110, a laptop computer 112, a tablet computer 114, and an HMD 116. However, any other or additional client devices could be used in the system 100. As described in more detail below, each client device 106-116 may encode or decode a point cloud to handle duplicate points. In various embodiments, each client device 106-116 104 may include a decoder for handling duplicate points in point cloud compression In this example, some client devices 108-116 communicate indirectly with the network 102. For example, the client devices 108 and 110 (mobile devices 108 and PDA 110, respectively) communicate via one or more base stations 118, such as cellular base stations or eNodeBs (eNBs). Mobile device 108 includes smartphones. Also, the client devices 112, 114, and 116 (laptop computer, tablet computer, and HMD, respectively) communicate via one or more wireless access points 120, such as IEEE 802.11 wireless access points. As described in more detail below the HMD 116 can display 360° scenes including one or more point clouds. Note that these are for illustration only and that each client device 106-116 could communicate directly with the network 102 or indirectly with the network 102 via any suitable intermediate device(s) or network(s). In various embodiments, server 104 or any client device 106-114 can be used to compress a point cloud and transmit the data to another client device such as any client device 106-116.

In various embodiments, the mobile device 108 (or any other client device 106 116) can transmit information securely and efficiently to another device, such as, for example, the server 104. The mobile device 108 (or any other client device 106-116) can function as a VR display when attached to a headset via brackets, and function similar to HMD 116. The mobile device 108 (or any other client device 106-116) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device 106-116 or the server 104 to encode, compress, transmit, receive, render a point cloud, or a combination thereof. For example, the server 104 can then compress, encode, and transmit the point cloud data to client devices 106-116. For another example, any client device 106-116 can compress and transmit point cloud data to any client devices 106-116 or to the server 104.

Figure 2:
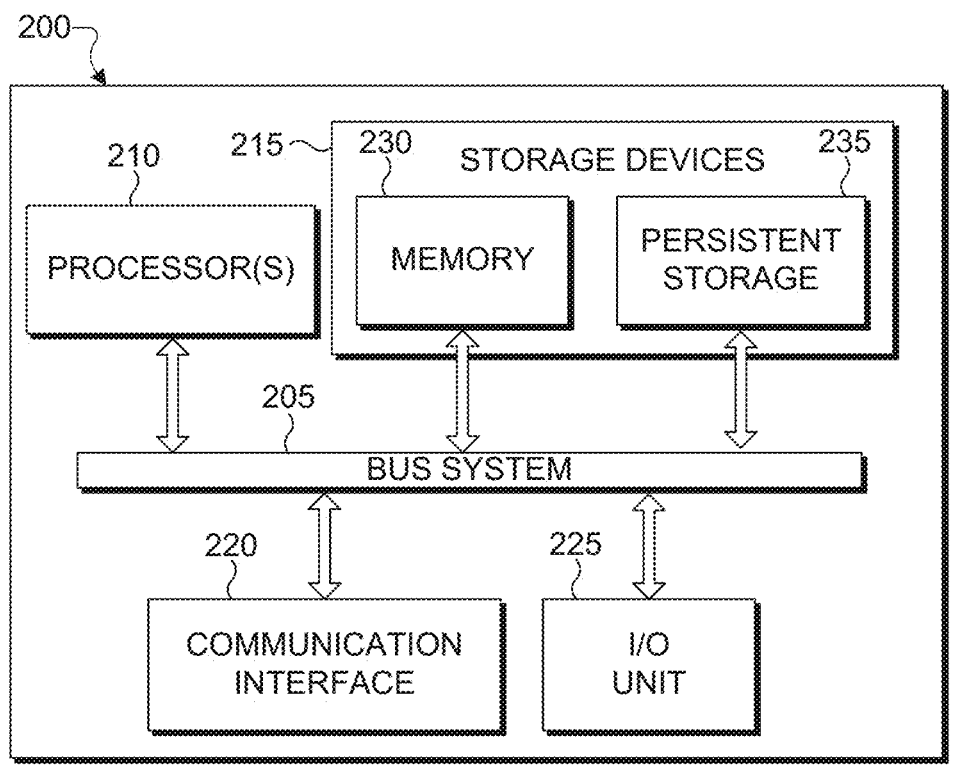
FIGS. 2 and 3 illustrate example devices in a computing system in accordance with an embodiment of this disclosure.
Figure 3:
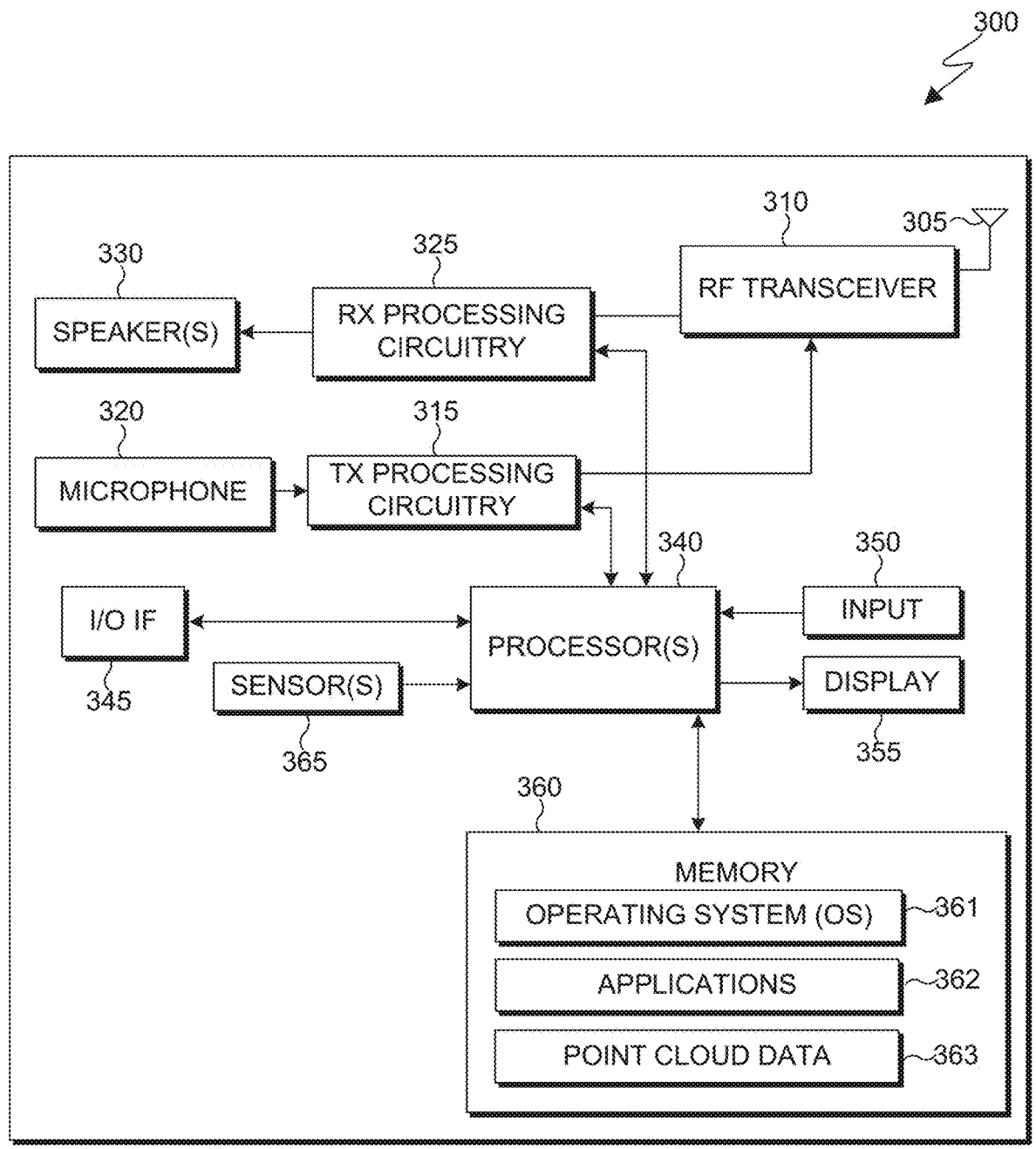

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-116 of FIG. 1.

Server 200 can represent one or more local servers, one or more compression servers, or one or more encoding servers. As shown in FIG. 2, the server 200 includes a bus system 205 that supports communication between at least one processor(s) 210, at least one storage device(s) 215, at least one communications interface 220, and at least one input/output (I/O) unit 225. In various embodiments, the server 200 is an encoder or a decoder.

The processor 210 executes instructions that can be stored in a memory 230. The instructions stored in memory 230 can include instructions for decomposing a point cloud, compressing a point cloud. The instructions stored in memory 230 can also include instructions for encoding a point cloud in order to generate a bitstream. The instructions stored in memory 230 can also include instructions for handling duplicate points in point cloud compression and/or rendering the point cloud on an omnidirectional 360° scene, as viewed through a VR headset, such as HMD 116 of FIG. 1. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). The persistent storage 235 can contain one or more components or devices supporting longer-term storage of data, such as a ready-only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or any other suitable input device. The I/O unit 225 can also send output to a display, printer, or any other suitable output device.

In various embodiments, server 200 implements the handling of duplicate points in point cloud compression, as will be discussed in greater detail below. Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only, and other embodiments could be used without departing from the scope of this disclosure. The electronic device 300 can come in a wide variety of configurations, and FIG. 3 does not limit the scope of this disclosure to any particular implementation of an electronic device. In various embodiments, one or more of the client devices 106-116 of FIG. 1 can include the same or similar configuration as electronic device 300. In various embodiments, electronic device 300 is an encoder, a decoder, or both.

In various embodiments, electronic device 300 is usable with data transfer, image or video compression, image or video decompression, encoding, decoding, and media rendering applications. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG.

1), a laptop (similar to laptop computer 112 of FIG. 1), a tablet (similar to tablet computer 114 of FIG. 1), a head-mounted display (similar to HMD 116 of FIG. 1), and the like.

As shown in FIG. 3, the electronic device 300 includes an antenna 305, a radio-frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes an operating system (OS) 361, one or more applications 362, and point clouds 363.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, WI-FI router, BLUETOOTH device) of the network 102 (such as a WI-FI, BLUETOOTH, cellular, 5G, LTE, LTE-A, WiMAX, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as for handling duplicate points in point cloud compression.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute the plurality of applications 362 based on the OS 361 or in response to signals received from eNBs (similar to the base stations 118 of FIG. 1) or an operator. The processor 340 is also coupled to the I/O IF 345 that provides the electronic device 300 with the ability to connect to other devices, such as client devices 106-116. The I/O IF 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track-ball, voice input, or any other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. As discussed in greater detail below, sensor 365 includes inertial sensors (such as accelerometers, gyroscope, and magnetometer), optical sensors, motion sensors, cameras, pressure sensors, heart rate sensors, altimeter, and the like. For example, input 350 can utilize motion as detected by a motion sensor, associated with sensor 365, as an input, in rendering 3D videos.

The processor 340 is also coupled to the display 355. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. Display 355 can be sized to fit within an HMD. Display 355 can be a singular display screen or multiple display screens capable of creating a stereoscopic display. In various embodiments, display 355 is a heads-up display (HUD).

The memory 360 is coupled to the processor 340. Part of the memory 360 could include a random-access memory (RAM), and another part of the memory 360 could include a Flash memory or other read-only memory (ROM).

The memory 360 can include persistent storage that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The point cloud data 363 can include various 3D point clouds, 3D meshes, 3D objects, and the like. In various embodiments, the electron device 300 handles duplicate points in the compression or decompression of the point cloud data 363. The electronic device 300 may reconstruct the point cloud data 363 to display one or more 3D objects or a 3D scene on the display 355.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing the direction of the user for three-dimensional content display identification, etc. Any of these sensor(s) 365 may be located within the electronic device 300, within a secondary device operably connected to the electronic device 300, within a headset configured to hold the electronic device 300, or in a singular device where the electronic device 300 includes a headset.

As will be discussed in greater detail below, in this illustrative embodiment, the electronic device 300 and/or the server 200 receive an encoded bit stream including the 3D point cloud data, decode the bit stream to identify a 2D frames, identify duplicate points in the frames based on depth values, and remove or ignore the duplicate points while reconstructing the 3D point cloud data.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

As discussed herein, a point cloud is a set of (x, y, z) coordinates (also referred to as points or vertices) that is used to represent objects (such as an exterior surface of the object) in 3D space. Point clouds are obtained from 3D scans using Lidar, RGB +Depth cameras or 3D reconstruction from multiple images using multi-view stereo. Each point in the point cloud may have multiple attributes such as color, material properties, normal, intensity (a measure of the return strength of the laser pulse that generated the points during scanning), etc. associated with the point. Since point clouds, especially those used to represent 3D maps, may contain several millions of points, the raw data size is usually massive and needs to be compressed.

For example, MPEG Test Model for Category 2 (TMC2) for compressing dynamic point clouds works by converting each 3D point cloud frame into a plurality of 2D image/video frames. A dynamic point cloud is a set of point cloud frames used to represent motion/moving 3D objects over time. For example, what a video is to an image, a dynamic point cloud is to a static point cloud. For TMC2, one set of image/video frames are used for capturing the geometry and another set for the texture. During the conversation from 3D to 2D, an orthogonal projection is employed in V-PCC, such that two out of the three geometry coordinates are implicitly encoded in the 2D position of the projected pixel in the image/video frame, and the third coordinate value (or some value derived from the third coordinate) is stored as the value of the pixel which represents the depth of the 3D coordinate from the plane (i.e., the depth value). Exactly, which of the x-, y- or z-coordinate is stored as the value depends on the direction of projection (or the orientation of the projection plane). The image/video frames are then compressed using existing image/video codecs (such as high efficiency video coding (HEVC)), enabling TMC2 to leverage existing codecs for the bulk of the compression process. At the decoder, the set of image/video frames for both geometry and texture are decompressed from the compressed bitstream. A point cloud is then reconstructed by re-projecting the points from the 2D frames to 3D space. TMC2 is just an example, and other embodiments and coordinate systems are possible.

However, such encoding techniques may generate significantly more points in the decoded point cloud than there are in the original (source) point cloud. Additionally, a significant amount of duplication of vertices may occur in the reconstructed point clouds. Very often, point clouds include a single attribute of each attribute type per point. For example, if the only attribute type of the given point cloud is color, then for every geometric point (x, y, z) there is only one associated color, such as a 3-tuple (r, g, b) color. Furthermore, in some embodiments, only a single color or attribute can be rendered per point. In other embodiments, each point may have multiple attributes. In one or more of these embodiments, duplicate points in the point cloud are points that have the same (or similar) geometric values (x, y, z). In others of these embodiments, duplicate points in the point cloud are points that have the same (or similar) geometric values (x, y, z) and some or all of the attributes (or vertices) are the same (or similar). Here, the same or similar means that the values are exactly the same or the values are within a set threshold depending on the context. For example, if a floating-point representation is used, then an "exact" comparison may not be meaningful and a threshold level of similarity is employed.

Embodiments of the present disclosure recognize that little if any benefit results in generating duplicate vertices in the point cloud since duplication does not serve to enhance the visual experience (e.g., such as provide view dependent color or reflectance modulation like light fields). Rather, these duplicate points lead to waste of computing resources, particularly for lossy PCC schemes, as this increases the data size, and introduces unnecessary overhead for transmission. Additionally, a significant increase in the number of vertices proportionally increases the complexity of the processing chain.

Figure 4:
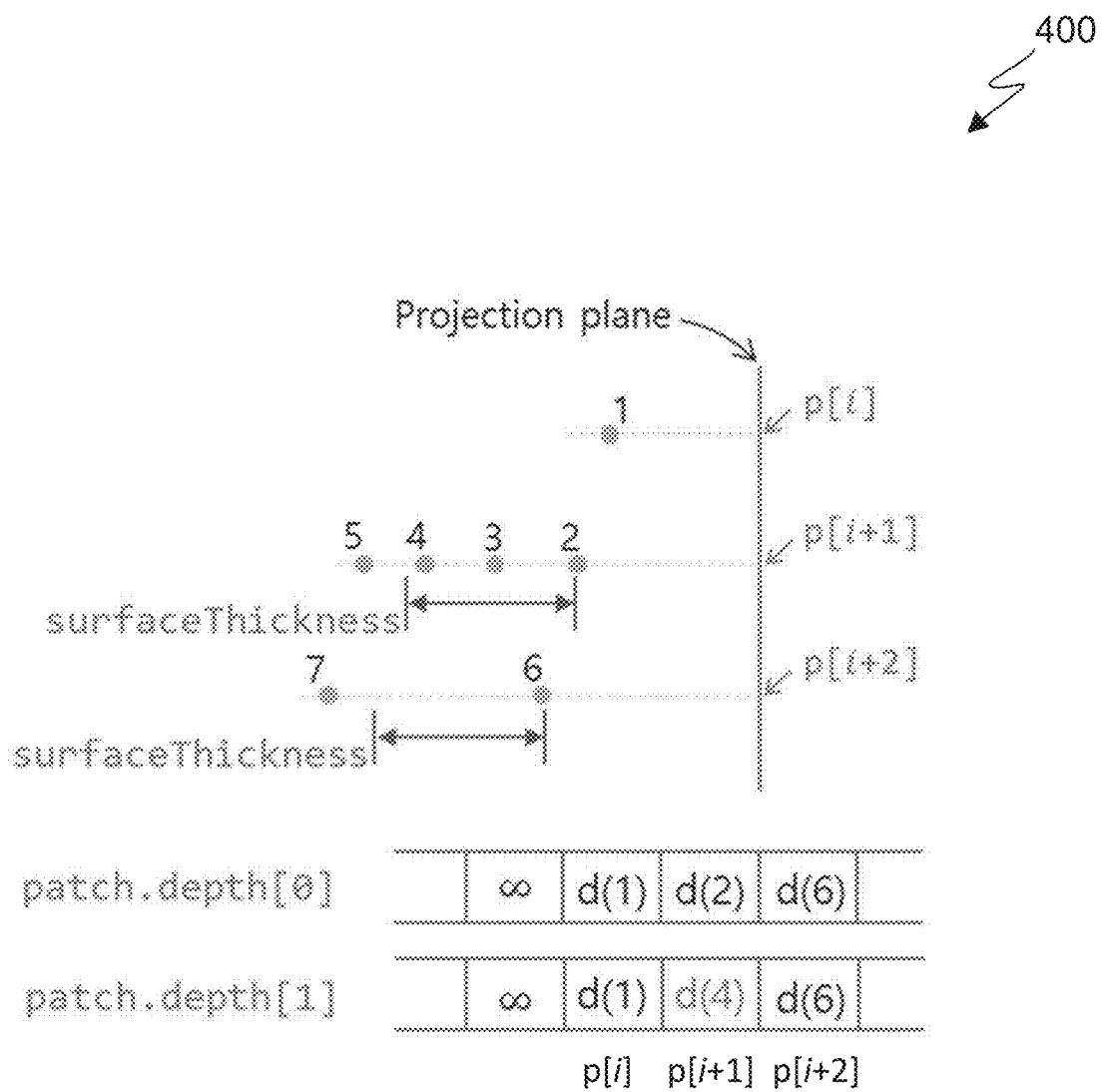
FIG. 4 illustrates an example of duplicate points in point cloud data in accordance with various embodiments of the present disclosure.

FIG. 4 illustrates an example of duplicate points in point cloud data in accordance with various embodiments of the present disclosure. The example of duplicate points in point cloud data shown in FIG. 4 is for illustration only. Other embodiments can be used without departing from the scope of this disclosure.

A common scenario encountered during the projection from a point cloud onto a plurality of planes (depth layers) is that multiple points could project on the same pixel location in the 2D plane. An example of where this scenario can happen is the use of point clouds to represent cloths that may have several folds/layers. For the assimilation of such points into patches, two depth vectors may be used for each patch: patch.depth[0] and patch.depth[1]. These vectors are used to store depth values from points staggered along the projection plane (e.g., along the dimension of depth). The other two dimensions of each point are encoded by the position of the projection on the 2D plane.

In FIG. 4, point 1 projects to the pixel location p[i] on the 2D projection plane. Its depth relative to the minimum depth of the patch, d(1), is stored in the vector patch.depth[0] at the index position [i]. Points 2, 3, 4, and 5 share the same location in the projection plane following projection. Similarly, points 6 and 7 share the same location in the projection plane. In this example, the relative depths of points 2 and 4 (d(2) and d(4), respectively) will be stored in patch.depth[0] and patch.depth[1], respectively, at the index position p[i+1] in the patch. Points 3 and 5 may be reconsidered for projection in a subsequent iteration. Between points 6 and 7, only the relative depth of point 6, d(6) will be stored in patch.depth[0] at the index position [i+2] since the depth of point 7 from point 6 is greater than the parameter "surfaceThickness." In this example, for the vector patch.depth [1], only one out of the three index locations store the depth value of a unique point, i.e., from point 4. The values in the remaining locations in the vector patch.depth[1] are duplicated from the corresponding locations in patch.depth[0]. Subsequently in the encoding pipeline, when a pair of 2D frames are generated for capturing the geometry, values from patch.depth[1] are used to create the first geometry frame and, in one embodiment, the difference values (or delta values) (i.e., patch.depth[1]—patch.depth[0]) are stored in the second geometry frame. In another embodiment, the actual values from the patch.depth[1] (instead of the delta values) are stored in the second geometry frame.

Later, the point cloud geometry is reconstructed from the encoded bitstream. This reconstruction also replicated at the encoder and the regenerated point cloud geometry is used for color approximation and texture generation at the encoder. During the point cloud geometry reconstruction, since there were several values in patch.depth[1] duplicated from patch.depth[0] during the creation of the patches, several duplicate points are generated in the reconstructed point cloud geometry. Additionally, the percentage of duplication increases at lower bit-rate settings.

The increase in duplication of points at lower bit-rate settings is a consequence of quantization artifacts of lossy compression. This is a secondary cause of duplicated points in the reconstructed point cloud. During lossy compression, especially for low-bitrates, if the difference between the values stored at the corresponding pixel locations in the two or more geometry frames is less than the quantization step, the depth values at these pixel locations may become identical following compression. Reconstruction of 3D points from these pixel locations result in duplicated points in the point cloud.

Figure 5:
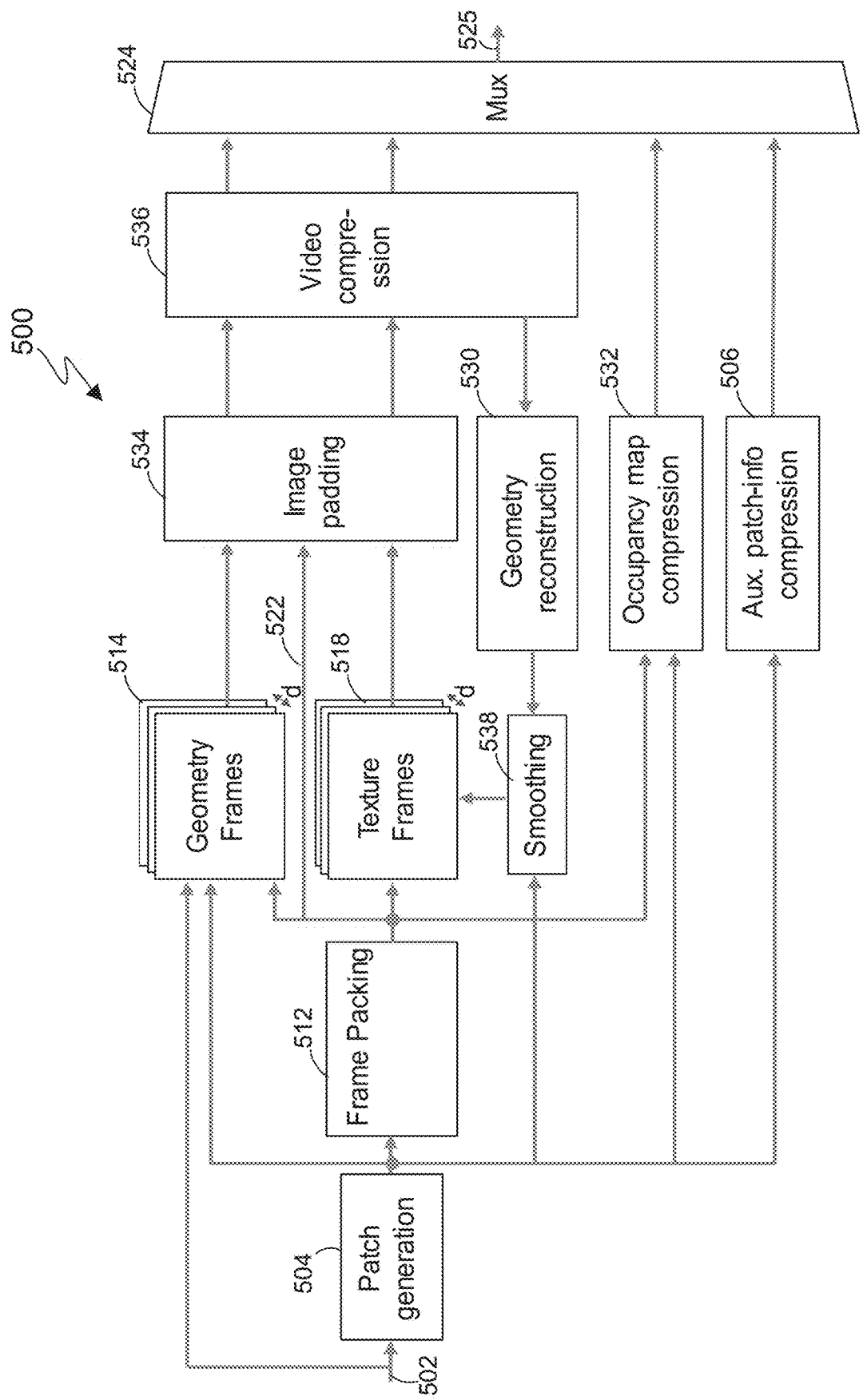
FIG. 5 illustrates an example block diagram of an encoder in accordance with various embodiments of this disclosure.
Figure 6:
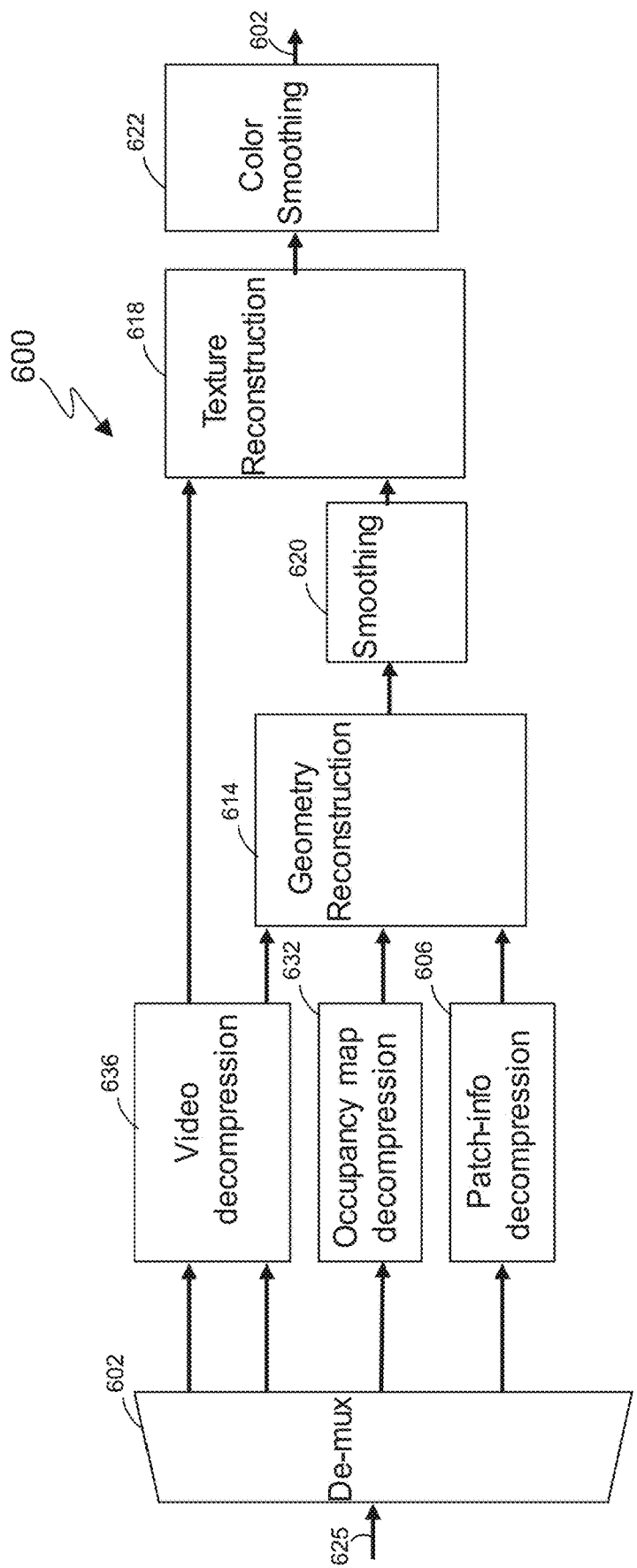
FIG. 6 illustrates an example block diagram of a decoder in accordance with various embodiments of this disclosure.

FIG. 5 illustrates an example block diagram of an encoder 500 in accordance with various embodiments of this disclosure. FIG. 6 illustrates an example block diagram of a decoder 600 in accordance with various embodiments of this disclosure. The encoder 500 can be similar to the server 104 of FIG. 1, any of the client devices 106-116 of FIG. 1, and include internal components similar to the server 200 of FIG. 2, and the electronic device 300 of FIG. 3. The decoder 600 can be similar to any of the client devices 106-116 of FIG. 1 and include internal components similar to the electronic device 300 of FIG. 3. The encoder 500 can communicate via network 102 to the decoder 750. The embodiment of the encoder 500 and the decoder 600 are for illustration only. Other embodiments could be used without departing from the scope of the present disclosure.

The encoder 500 can compress, encode, and transmit a point cloud, a mesh, or both, as an encoded bitstream 525. In various embodiments, the encoder 500 generates multiple 2-D frames in which a point cloud or a mesh is mapped or projected onto. For example, the point cloud is unwrapped and mapped onto multiple 2-D frames. For example, the point cloud can be unwrapped along one axis (such as the Y-axis), and the image is mapped along the remaining axis (such as X and Z axis). In various embodiments, the encoder 500 generates an occupancy map (such as the occupancy map 522) that indicates where each pixel of the point cloud is located when the point cloud is mapped onto the 2-D frame. For example, the occupancy map indicates valid points and invalid points of each frame. The invalid points are locations of the frame that does not correspond to a point of the point cloud, whereas a valid point is a location of the frame that corresponds to a point in the 3D point cloud. In various embodiments, encoder 500 is a web server, a server computer such as a management server, or any other electronic computing system capable of, mapping the three dimensions of a point cloud into two dimensions, compressing frames, and encoding images for transmission. In various embodiments, the encoder 500 can be a "cloud" of computers interconnected by one or more networks, where each is a computing system utilizing clustered computers and components to act as a single pool of seamless resources when accessed through network 102 of FIG. 1.

The decoder 600 can decode, decompress, and generate a received encoded bitstream (such as the encoded bitstream 525 of FIG. 5) that includes a representation of a point cloud, a mesh, or both. In various embodiments, the decoder 550 generates multiple point clouds from a received bitstream that includes multiple 2-D frames. For example, each of the pixels of the point cloud can be mapped based on the information received in the 2-D frames and a received occupancy map.

The encoder 500 illustrates a high-level overview of an embodiment of the present disclosure of an electronic device that handles duplicate points in point cloud compression. In various embodiments, the encoder 500 packages a point cloud for transmission by a bitstream to one or more decoders (such as the decoder 600). The encoder 500 receives and encodes point cloud 502. To do so, the encoder 500 includes a patch generation block 504, an auxiliary patch-information compression block 506, a frame packing block 512, a geometry reconstruction block 530, an occupancy map compression block 532, an image padding block 534, a video compression block 536, a smoothing block 538, and a multiplexer 524. In generating the encoded bitstream 525, the encoder 500 generates various frames (such as geometry frames 514 and texture frames 518) and an occupancy map 522.

Point cloud 502 represents the input into the encoder 500. The point cloud 502 can be stored in memory that is associated with the encoder 500. The patch generation block 504 decomposes the point cloud 502 and creates multiple patches. The patches can be organized by an attribute. For example, the attributes can include geometry and a texture. Geometry is the geographic location of each point of the point cloud 502. Texture represents various aspects of each point of the point cloud 502, such as color, intensity, normal, reflection, and the like. The patch generation block 504 clusters geometry attributes and texture attributes. The clustering can be based on criteria such as a normal direction, distance to projected frames, contiguity, and the like. Each generated cluster is represented as a patch.

In various embodiments, the patch generation block 504 projects and maps the points of the point cloud onto 2-D frames via a one-to-one mapping. In various embodiments, the patch generation block 504 projects and maps the points of the point onto 2-D frames via projecting the points onto different planes. In various embodiments, projecting and mapping the points of a point cloud onto 2-D frames can be based on a raster scan mapping, mapping based on the X geometric coordinate, mapping based on the Y geometric coordinate, mapping based on the Z geometric coordinate, mapping based on color, mapping based on normal direction, and the like.

In various embodiments, after projecting and mapping the points of the point cloud onto the 2-D frame, the frame packing block 512 sorts and packs the points in the 2-D frame to increase coding efficiency. The frame packing block 512 sorts and packs the points within a patch. In various embodiments, the encoder 500 can also include a sorting engine (not shown) that places neighboring points and points that include spatially correlated data adjacent to each other.

The patch generation block 504 also generates auxiliary patch-information auxiliary patch-information that is compressed by auxiliary patch-information block 506. The auxiliary patch-information 506 is information that is associated with each generated patch. In various embodiments, the auxiliary patch-information is metadata about the patches. For example, every patch has associated with it, auxiliary information such as (i) spatial position offsets, (ii) depth offset, (iii) location of patch in the video frame, (iv) size of the patch (such as the height and width of the patch), (v) index of projection plane, and the like. The auxiliary patch-information is used by the decoder, such as the decoder 600, to reconstruct the point cloud.

The frame packing block 512 sorts and packs the patches into the geometry frames 514 and the texture frames 518. The geometry and texture information corresponding to the patches generated by the patch generation block 504 are packed into separate video frames, such as the geometry frames 514 and the texture frames 518. In various embodiments, the frame packing block 512 creates the geometry frames 514 and the texture frames 518. The frame packing block 512 also determines the height and width of the frame based on how the patches are arranged and packed into a frame. The regular patches are arranged to occupy minimum space in a frame. That is, the size of the frame is determined based on the location of each patch, within the frame. Therefore, the frame is the smallest possible size based on how the patches are oriented and positioned within the frame.

The frame packing block 512 also creates the occupancy map 522. The occupancy map 522 indicates the pixel location in the frames (such as the geometry frames 514 and the texture frames 518) that contain valid points of the point cloud that are projected or mapped onto the respective frames. For example, the occupancy map 522 indicates whether each pixel on each frame (such as the geometry frames 514 and the texture frames 518) is a valid pixel or blank. A valid pixel on the occupancy map indicates a pixel on the 2-D frame that corresponds to a 3D point in the point cloud. In various embodiments, the occupancy map 522 can be the same for each frame, such as the geometry frames 514 and the texture frames 518. In various embodiments, the occupancy map 522 represents multiple occupancy maps, where each occupancy map corresponds to one frame (such as the geometry frames 514 and the texture frames 518). The occupancy map 522 can be included in another frame, similar to that of the geometry frames 514 or the texture frames 518. In various embodiments, the occupancy map 522 can be transmitted as metadata as a separate bitstream. The image padding block 534 adds padding to the geometry frames 514 and the texture frames 518 based on locations indicated by the occupancy map 522. The video compression block 536 compresses the geometry frames 514 and the texture frames 518, for example, using a video compression codec such as HEVC or other video codecs.

In various embodiments, the geometry reconstruction block 530 performs prediction by reconstructing the point cloud data for a current set of geometry frames 514 and/or texture frames 518 and comparing the current frames to a next set of frames. In these embodiments, the geometry reconstruction block 530 can generate difference or delta information between the sets of frames to provide additional coding efficiencies or improvements for interrelated frames in the encoded bitstream. This difference or delta information can be encoded as or in the next set of texture frames 518 after smoothing is performed by smoothing block 538. In so doing, in various embodiments, the geometry reconstruction block 530 provides for the handling duplicate points in point cloud compression as discussed in greater detail below. For example, the geometry reconstruction block 530 may identify and ignore or remove duplicate points in the reconstruction of the point cloud while performing prediction to decrease the amount of computing resources needed to reconstruct the point clout.

In various embodiments, the auxiliary patch-information, the occupancy map 522 (after compression by occupancy map compression block 532), or both, are encoded as well. Thereafter, the auxiliary patch-information, the encoded geometry frames 514 and the encoded texture frames 518, and the occupancy map 522 are multiplexed via multiplexer 524. The multiplexer 524 combines the auxiliary patch-information 506, the encoded geometry frames 514, the encoded texture frames 518, and the occupancy map 522 to create a single encoded bitstream 525.

FIG. 6 illustrates a high-level overview of the decoder 600 according to various embodiments of the present disclosure. For example, the decoder 600 may be included in an electronic device to decode and reconstruct a point cloud for rendering. In various embodiments, the decoder extracts the compressed geometry and attributes from the bitstream 625. In various embodiments, the decoder 600 maps the geometry and attribute information encoded in the bitstream 625 to regenerate the point cloud 602. The decoder 600 includes a demultiplexer 624, decompression blocks 636, 632, and 606 for video, occupancy map, and patch-info decompression, respectively, as well as, geometry and texture reconstruction blocks 614 and 618, respectively. To reconstruct the 3D point cloud, the decoder 600 uses information within the patches of the various video frames (such as the geometry frames 514 and the texture frames 518) and patch metadata (such as included in the auxiliary patch-information, and the occupancy map 522) demultiplexed and decompressed from the encoded bit stream 625.

The decoder 600 receives the encoded bitstream 625, for example, that was encoded by and received from the encoder 500. Upon receiving the encoded bitstream 625, the demultiplexer 624 separates various streams of data from the encoded bitstream 625. For example, the demultiplexer 624 separates various streams of data such as the geometry frame information (originally the geometry frames 514), texture frame information (e.g., the texture frames 518), the occupancy map information (e.g., the occupancy map 522), and the auxiliary patch information. For example, the demultiplexer 662 demultiplexes the encoded bitstream 626 into separate compressed bitstreams for point cloud geometry, texture, other attributes, occupancy map, and patch information.

The occupancy map information decompressed by occupancy map decompression block 632 indicates the valid pixel location within the 2D frames to reconstruct the point cloud 602. The locations and dimensions of the regular patches are retrieved from the decoded auxiliary patch information decompressed by patch information decompression block 606. For example, the points are reconstructed from the regular patches by adding the patch offsets (from decoded auxiliary patch information) to the spatial location of the points in the video and adding depth offset of the patch to the value of the pixel at the spatial location. In various embodiments, decoding engine 672 can be lossless or lossy. In various embodiments, the decoder 60 can reconstruct the point cloud from the lossy or losslessly encoded bitstream.

In various embodiments, the geometry reconstruction block 614 decodes the geometry frame information and identifies duplicate points, for example, based on point geometry and/or other attributes of the point, the occupancy map, and or patch information, as discussed in greater detail below, and removes or ignores the duplicate points in reconstructing the point cloud 602. The geometry reconstruction block 614 generates the geometry of the points in the point cloud 602 from the 2D geometry frames which are smoothed by smoothing block 620. Texture reconstruction block 618 applies the texture (e.g., color, view dependent color, normal, reflectance, etc.) to the points in the point cloud 602, which are smoothed by color smoothing block 622. In identifying and removing (or ignoring) the duplicate points according to embodiments of the present disclosure, the amount of hardware resources in geometry and texture reconstruction are vastly reduced. Additionally, according to embodiments of the present disclosure, the points ignored or removed are duplicative such that their removal does not significantly impact the quality of the rendered 3D point cloud.

Although FIGS. 5 and 6 illustrate examples of a decoder and encoder, various changes can be made to FIGS. 5 and 6. For example, various components in FIGS. 5 and 6 could be combined, further subdivided, or omitted and additional components could be added or removed according to particular needs. For example, encoding and decoding for MPEG TMC2 (V-PCC) is used as example, and embodiments of the present disclosure can be utilized with other types of point cloud encoding and decoding techniques.

Figure 7:
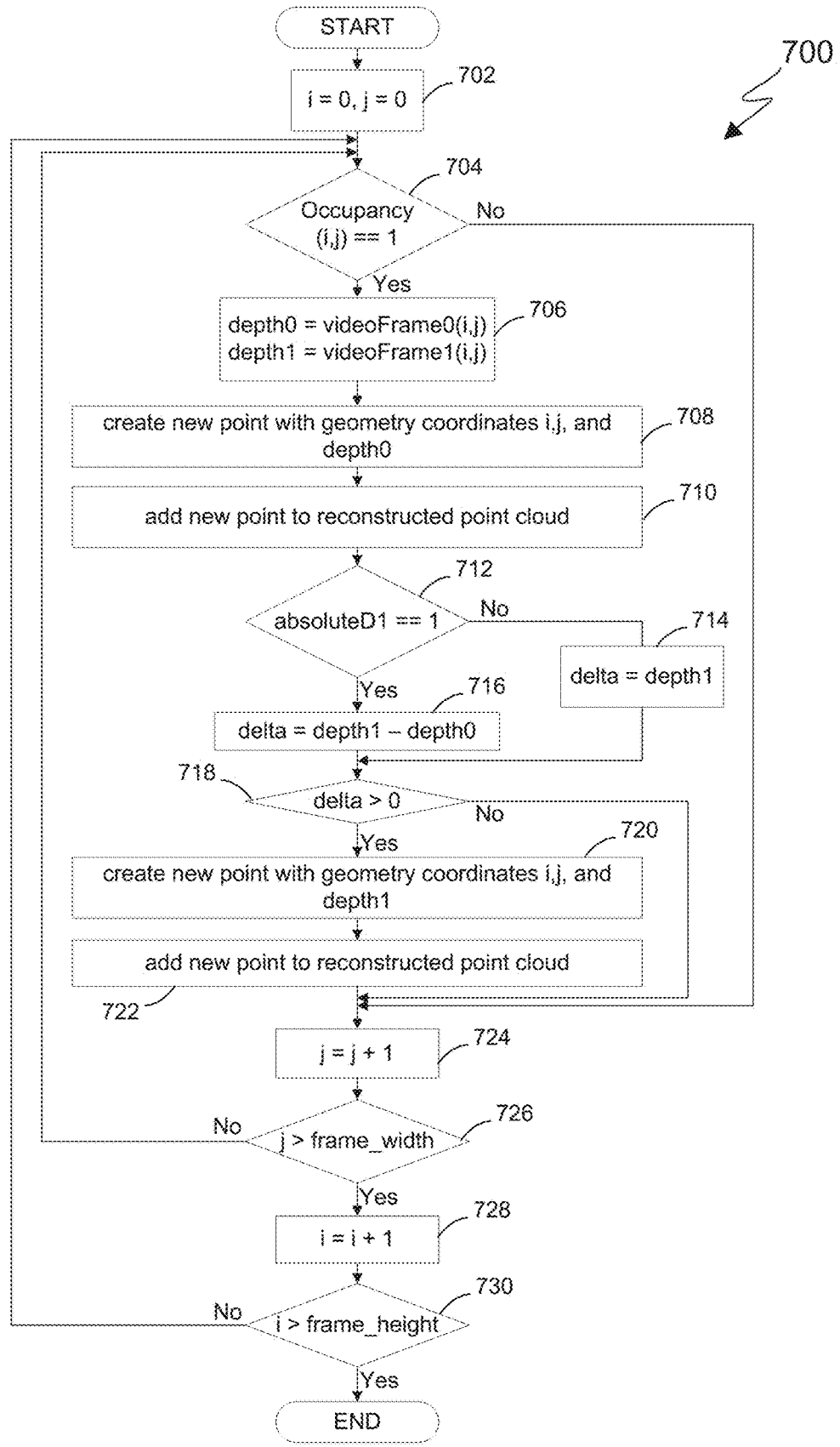
FIG. 7 illustrates a flowchart for a duplicate point removal process based on geometry in accordance with various embodiments of the present disclosure.

FIG. 7 illustrates a flowchart for a duplicate point removal process 700 based on geometry in accordance with various embodiments of the present disclosure. For example, the process depicted in FIG. 7 may be performed by the server 200 in FIG. 2 or the electronic device 300 in FIG. 3 or the geometry reconstruction blocks 530 and/or 614 in FIGS. 5 and 6, respectively, generally referred to here as the system.

The system begins by starting with the first pixel (i=0, j=0) in the geometry frame (step 702). If occupied (step 704) (e.g., based on an occupancy map), the system looks to the values in two depth layers (step 706), creates a new point (step 708) and adds the point to the reconstructed point cloud (step 710) for the first depth layer (D0).

For example, referring back to FIG. 4, in one embodiment, the encoder 500 employs two frames for coding the geometry and texture per point cloud frame, the values stored in the first geometry video frame is obtained from the values in the first depth layer (D0), and the values stored in the second geometry frame is obtained after subtracting the value in the first depth layer from the corresponding value in the second depth layer (D1). In such an implementation, defining delta(i,j) as the difference between the value of the second depth layer (D1) and the first depth layer (D0) at position (i, j), the delta(i,j) is obtained, after decoding the compressed bitstream, directly by reading the value of the pixel at position (i, j) in the second video frame. This pixel encoding is referred to as actual value or absolute value (i.e., the flag "absolute D1"==1 at step 712) as the actual depth value of the point from the projected plane (or actual depth value minus the offset). For example, an offset is used as the minimum of depth values of all points in a group of points (i.e., the patch). This is mainly done to ensure that the 10-bit depth values can "broken up" to store in 8-bit video frames. The first frame is used to store the actual value minus an offset. For absolute values, the second frame also stores the actual value minus the offset of.

As a result, the delta is calculated as the value for depth1-depth0 (step 716) and if not greater than zero (step 718) (or in some embodiments within a set threshold of zero), the system identifies the point as geometry duplicative and removes the point (or ignores/does not include/create) from the point cloud as the system looks to the next width pixel (i.e., j=j+1) (step 724). If, however, the point is not geometry duplicative, the system creates the new point and adds the new point to the reconstructed point cloud for the second depth (d1) layer (steps 720 and 722) similarly as done for the point for the first depth (d0) layer as discussed above.

In another embodiment, the encoder 500 employs two (or more) frames for coding the geometry and texture per point cloud frame, the values stored in the first geometry video frame are obtained from the values in the first depth layer (D0), and the values stored in the second geometry frame is obtained from the second depth layer (D1). In such an implementation, the delta(i,j) is obtained, after decoding the compressed bitstream, by subtracting the value of the first geometry video frame, at position (i,j), and the second geometry video frame at position (i, j). This value is referred to as the delta value (i.e., the flag "absolute D1" is not set at step 712) as the difference between the actual point depth and the point depth in the previous frame.

As a result, the delta is the value stored for the pixel and if not greater than zero (step 718) (or in some embodiments within a set threshold of zero), the system identifies the point as geometry duplicative and removes the point (or ignores/ does not include/create) from the point cloud as the system looks to the next width pixel (i.e., j=j+1) (step 724). If, however, the point is not geometry duplicative, the system creates the new point and adds the new point to the reconstructed point cloud for the second depth (dl) layer (steps 720 and 722) similarly as done for the point for the first depth (d0) layer as discussed above. Thereafter, the system continues the process for all frame width coordinates j (steps 724 and 726) and then all frame height coordinates i (Steps 728 and 730), until the entirety of the set of frames have been processed As discussed herein, absolute D1 is a flag to distinguish between the two encoding configurations illustrated above. That is, if absolute D1=1 then, the second video frame stores the values of the second depth layer (D1) (possibly minus an offset, if offsets are used), otherwise the second video frame stores the difference in values of the second depth layer (D1) and the first depth layer (D0) (possibly minus an offset, if offsets are used).

In these embodiments, the system avoids adding these geometric duplicate points to the reconstructed point cloud geometry by checking for the value of delta, and only adds the point to the cloud if and only if delta is greater than zero (i.e., not geometry duplicative). The point cloud from the decoded geometry video frames is reconstructed in a function called GeneratePointCloud( ) Pseudocode for adding points is shown below from the second frame:

```
for every location in the 2D geometry frame:
---> if (first frame):
------> generate 3D point from the position in 2D frame and value of depth
        at that location
------> add point to the point cloud
---> if (second frame):
------> if (absoluteD1):
---------> delta = value in the current location in frame - value in the
              current location in the first frame
------> else:
---------> delta = value in the current location in frame
------> if (delta > 0):
---------> generate 3D point from the position in the 2D frame and value of
        the depth at that location
```

The embodiment illustrated in FIG. 6 is indented as an example. For example, while discussing comparison of two geometry and texture frames, any number of geometry and texture frames may be compared, and duplicative points therein may be handled as discussed. In another example, the projected points that are correlated (based on projection direction, neighborhood, color similarity, etc.) are grouped in the form of patches. During the reconstruction of the point cloud from the decoded geometry frame, the points are retrieved from the geometry frames in a patch-by-patch fashion. The duplication check is also carried out in a patch-by-patch fashion as described in the following pseudo code provided below, variables of which are defined in Table 1 below.

Pseudocode of an embodiment that illustrates how the duplicate points are prevented when the projected points are stored in correlated groups within geometry frames:

```
for( p = 0; p <= patch_count_minus1; p++ ) {
  patch = patches[p]
  for ( v0 = 0; v0 < patch.sizeV0; v0++ ) {
    for ( u0 = 0; u0 < patch.sizeU0; u0++ ) {
      for ( v1 = 0; v1 < occupancyResolution; v1++ ) {
        v = v0 * occupancyResolution + v1;
        for ( u1 = 0; u1 < occupancyResolution; u1++ ) {
          u = u0 * occupancyResolution + u1;
          x = patch.u0 * occupancyResolution + u;
          y = patch.v0 * occupancyResolution + v;
          occupancy = oFrame[x][y]
          if (occupancy == 1){
            depth0 = gFrame[0][0][x][y];
            point0[patch.normalAxis] = depth0 + patch.d1;
            point0[patch.tangentAxis] = u + patch.u1;
            point0[patch.bitangentAxis] = v + patch.v1;
            recPc.addPoint(point0) // add the first point to the
              reconstructed point cloud
            if (geometry_absolute_coding_enabled_flag == 1){
              for ( l = 1; l <= layer_count_minu1; l++) {
                depthl = gFrame[l][0][x][y];
                delta = depth0 - depthl;
                if (delta > 0){
                  pointl[patch.normalAxis] = depthl + patch.d1
                  pointl[patch.tangentAxis] = u + patch.u1;
                  pointl[patch.bitangentAxis] = v + patch.v1;
                  recPc.addPoint(pointl) // add the point from level 1
                    to the reconstructed point cloud
                }
              }
            }
            else { // geometry_absolute_coding_enabled_flag is 0
              for ( l = 1; 1 <= layer_count_minu1; l++) {
                depthl = gFrame[l][0][x][y];
                delta = depthl;
                if (delta > 0){
                  pointl[patch.normalAxis] = depthl + patch.d1
                  pointl[patch.tangentAxis] = u + patch.u1;
                  pointl[patch.bitangentAxis] = v + patch.v1;
                  recPc.addPoint(pointl) // add the point from level 1
                    to the reconstructed point cloud
                }
              }
            }
          }
        }
      }
    }
  }
}
```

TABLE 1

Explanation of variables in the pseudo-code provided above, which illustrates how the duplicate points are handled when the projected points are stored in correlated groups within geometry frames.

| | |
|---|---|
| layer_count_minus1 | the number of layers for encoding the geometry or attribute information |
| patch_count_minus1 | the number of patches in the geometry (or attribute) frame |
| geometry_absolute_coding_enabled_flag | flag to indicate absolute d1 coding is enabled or not |
| gFrame | the decode geometry frame, represented as gFrame[1][c][x][y], where 1 = 0 . . . layer_count_minus1 is the depth layer (a geometry video frame), c = 0 is the first color plane in the video geometry video frame, x = 0 . . . frame_width − 1, is the column index, and y = 0 . . . frame_height − 1, is the row index for that layer |
| oFrame | the decoded occupancy map frame, represented as oFrame[x][y], where, x = 0 . . . frame_width − 1, is the column index and y = 0 . . . frame_height − 1, is the row index |
| recPc | point cloud reconstructed from the decoded geometry and attribute information |
| patch | a patch from which points are to be retrieved and added to the list of points in the reconstructed point cloud |

TABLE 1-continued

Explanation of variables in the pseudo-code provided above, which illustrates how the duplicate points are handled when the projected points are stored in correlated groups within geometry frames.

| | |
|---|---|
| patch.u0 | column location of patch in the geometry video frame in units of occupancyResolution (see below) |
| patch.v0 | row location of patch in the geometry video frame in units of occupancyResolution (see below) |
| patch.u1 | tangential shift (top most row of the patch) in the geometry video frame |
| patch.v1 | bitangential shift (left most row of the patch) in the geometry video frame |
| patch.d1 | depth shift (minimum depth of the patch) |
| | patch.sizeV0 height of a patch in units of occupancyResolution (see below) |
| patch.sizeU0 | width of a patch in units of occupancyResolution (see below) |
| patch.normalAxis | a number between, for example between 0 and 2 (inclusive), to indicate the axis along with all the 3D points in the patch are orthogonally projected on to the projection plane |
| patch.tangentAxis | a number between, for example between 0 and 2 (inclusive), to indicate the one of the two axes on the 2D plane of the patch |
| patch.bitangentAxis | a number between, for example between 0 and 2 (inclusive), to indicate the one of the two axes on the 2D plane of the patch |
| occupancyResolution | the minimum unit of block (or grid) size in the video frame that belongs to a unique patch. In other words, pixels from two different blocks cannot occupy the same occupancyResolution x occupancyResolution block |
| point0, point1 | 3D points obtained from the geometry frames |
| addPoint( ) | function to add a point (defined by the geometry coordinates) to the corresponding point cloud. |

In yet another embodiment, wherein the projected points are grouped into patches which are packed and encoded in a two geometry video frames and two attribute video frames per point cloud frame, and the only attribute present in the point cloud is the color (or texture), the point cloud at the decoder is reconstructed from the patches in the two decoded geometry and two decoded attribute frames. Furthermore, in this embodiment, the patch sizes are difference-encoded as auxiliary patch information (i.e., as part of metadata).

In this embodiment, first, the patch information is retrieved as follows:
Patch2dShiftU=patch.patch_2d_shift_u*patch.occpancy_packing_block_size
Patch2dShiftV=patch.patch_2d_shift_v*patch.occupancy_packing_block_size
Patch2dSizeU=patch.patch_2d_delta_size_u*patch.occupancy_packing_block_size
Patch2dSizeV=patch.patch_2d_delta_size_v*patch.occupancy_packing_block_size
Patch3dShiftX=patch.patch_3d_shift_tangent_axis
Patch3dShiftY=patch.patch_3d_shift_bitangent_axis
Patch3dShiftZ=patch.patch_3d_shift_normal_axis
where,
occupancy_packing_block_size is the same as occupancyResolution in Table 1.
patch_2d_shift_u specifies the x-coordinate of the top-left corner of the patch bounding box expressed as multiple of occupancy_packing_block_size. The value of patch_2d_shift_u is in the range of 0 to (frame_width/occupancy_packing_block_size −1), inclusive.
patch_2d_shift_v specifies the y-coordinate of the top-left corner of the patch bounding box expressed as multiple of occupancy_packing_block_size. The value of patch_2d_shift_v is in the range of 0 to (frame_height/occupancy_packing_block_size−1), inclusive.
patch_2d_delta_size_u is the difference of patch width between the current patch and the previous one.
patch_2d_delta_size_v is the difference of patch height between the current patch and the previous one.
patch_3d_shift_tangent_axis is the same as patch.tangentAxis in Table 1.
patch_3d_shift_bitangent_axis is the same as patch.bitangentAxis in Table 1.
patch_3d_shift_normal_axis is the same as patch.normalAxis in Table 1.

In this step, from the decoded geometry frame together with decoded frame patch information and decoded occupancy map, a point cloud with no added color is generated. At second step, for lossy encoding, the generated (reconstructed) point cloud is input to a geometry smoothing process. Finally, colors are added to the smoothed cloud point, from decoded texture frames. The decoded geometry frame contains two frames, corresponding to the near and far layers, per point cloud and the decoded attribute frame contains two frames, corresponding to the near and far layers, per point cloud. There are two points that are generated per pixel position if the occupancy value at that pixel is 1, one from the near layer and one from the far layer.

Two points are generated from each pixel in the patch for x from Patch2dShiftU to (Patch2dShiftU+Patch2dSizeU) and y from Patch2dShiftV to (Patch2DShiftV+Patch2dSizeV). If the occupancy value at a pixel, oFrame [x][y], is equal to 1, the first point is derived and added to the reconstructed point cloud as follows:
1. Firstly, x_new and y_new are obtained for pixel (x, y) based on the patch packing direction.
2. The coordinates of the point are derived from the geometry frame as follows:
point 1[0]=x_new+Patch3dShiftX
point 1[1]=y_new+Patch3dShiftY
point 1[2]=gFrame[0][x_new][y_new]+Patch3dShiftZ 3. The point is colored by using the attribute frame as follows:
point 1[3]=aFrame[0][0][x_new][y_new]
point 1[4]=aFrame[0][1][x_new][y_new]
point 1[5]=aFrame[0][2][x_new][y_new]
4. The point is then added to the reconstructed point cloud as follows:
addPointToPointCloud(recPc, point1)
The second point is derived as follows:
1. First the coordinates of the point are derived from the geometry frame as follows:

```
point2[0] = x_new + Patch3dShiftX
point2[1] = y_new + Patch3dShiftY
if(!geometry_absolute_coding_enabled_flag)
    point2[2] = gFrame[0][x_new][y_new] +
        gFrame[1][x_new][y_new] + Patch3dShiftZ
else
    point2[2] = gFrame[1][x_new][y_new] +
        Patch3dShiftZ
```

2. The point is colored by using the attribute frame as follows:
point2[3]=aFrame[1][0][x_new][y_new]
point2[4]=aFrame[1][1][x_new][y_new]
point2[5]=aFrame[1][2][x_new][y_new]
3. The point is then added to the reconstructed point cloud, if it is not a duplicate of the first point, as follows:
if((point1[10]−point2[0]) && (point1[1]−point2[1] && (point1[2]−point2[2])) addPointToPointCloud (recPc, point2)

A pseudocode implementation of the embodiments discussed in the above steps is provided below.

Pseudocode of an example where the projected points are grouped into patches, which are packed and encoded in a two geometry video frames and two attribute video frames per point cloud frame, the only attribute present in the point cloud is the color (or texture), and the point cloud at the decoder is reconstructed from the patches in the two decoded geometry and two decoded attribute frames.

```
for (x_new = Patch2dShiftU ; x_new < (Patch2dShiftU + Patch2dSizeU);
x_new++)
  for (y_new = Patch2dShiftV ; y_new < (Patch2dShiftV +
  Patch2dSizeV); y_new++)
    if (oFrame[x_new][y_new] == 1) {
      point[numPtsAdded][0] = x_new + Patch3dShiftX
      point[numPtsAdded][1] = y_new + Patch3dShiftY
      point[numPtsAdded][2] = gFrame[0][x_new][y_new] +
        Patch3dShiftZ
      for ( i= 0; i < 3; i++)
        point[numPtsAdded][3+i] = aFrame[0][i][x_new][y_new]
      addPointToPointCloud(recPc, point[numPtsAdded])
      numPtsAdded++
      point[numPtsAdded][0] = x_new + Patch3dShiftX
      point[numPtsAdded][1] = y_new + Patch3dShiftY
      if(!geometry_absolute_coding_enabled_flag){ }
        point[numPtsAdded][2] = gFrame[0][x_new][y_new] +
gFrame[1][x_new][y_new] + Patch3dShiftZ
      else
        point[numPtsAdded][2] = gFrame[1][x_new][y_new] +
          Patch3dShiftZ
      for (i = 0; i < 3; i++)
        point[numPtsAdded][3+i] = aFrame[1][i][x_new][y_new]
      delta = point[numPtsAdded − 1][2] − point[numPtsAdded][2]
      if (delta > 0) {
        addPointToPointCloud(recPc, point)
        numPtsAdded++
      }
    }
```

Embodiments of the present disclosure recognize that, at low bitrates, slight degradation in the reconstructed point cloud may occur if the duplication of points is prevented at the encoder. Therefore, in some embodiments, duplicate point handling is implemented only at the decoder if the bitrate is low (i.e., not implanted at the encoder also). The pseudocode for preventing duplication of points during point cloud geometry reconstruction only at the decoder is shown below.

Pseudocode for adding points from the second frame in GeneratePointCloud( )to avoid duplication of points at the decoder:

```
for every location in the 2D geometry frame:
---> if (first frame):
------> generate 3D point from the position in 2D frame and value of
depth
        at that location
------> add point to the point cloud
---> if (second frame):
------> if (absoluteD1):
---------> delta = value in the current location in frame - value in the
            current location in the first frame
------> else:
---------> delta = value in the current location in frame
------> if (encoder)
---------> generate 3D point from the position in the 2D frame and value
of
        the depth at that location
------> else if (decoder and delta > 0):
---------> generate 3D point from the position in the 2D frame and value
of the depth at that location
```

Figure 8:
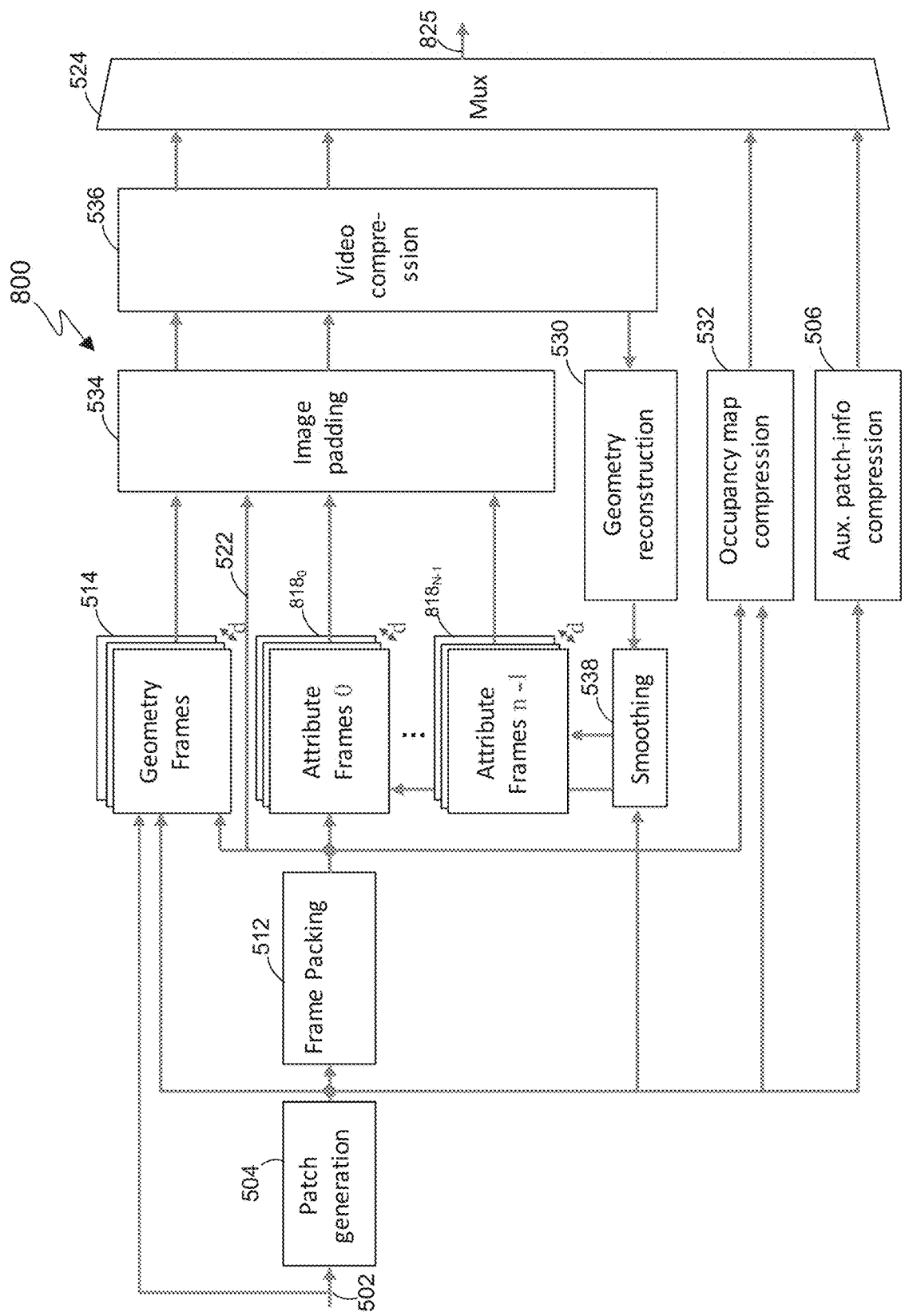
FIG. 8 illustrates an example block diagram of an encoder for multi-attribute point clouds in accordance with various embodiments of this disclosure.

FIG. 8 illustrates an example block diagram of an encoder 800 for multi-attribute point clouds in accordance with various embodiments of this disclosure. The embodiment of the encoder 800 is for illustration only. Other embodiments could be used without departing from the scope of the present disclosure.

In certain high-end immersive media applications, a multi-attribute point cloud is used in which there are multiple attribute values (e.g., view dependent color, normal, reflectance, etc.) for the same geometric point. These applications typically use surface light field like point cloud to render view dependent attributes. That is, the color of the points in the point cloud rendered (or observed) is dependent on the view direction. In other cases, such as, data obtained from lidars, the source point cloud may contain multiple view-dependent attributes per geometry point.

In these embodiments, the source point cloud contains multiple attributes for every uniquely defined geometry coordinate. That is, the geometry coordinates are not repeated in the source point cloud. For such point cloud reconstruction at the decoder (and at the encoder), the duplicate points can be removed by comparing only the geometry values of the points during the reconstruction of the geometry points as discussed with regard to FIGS. 5-7 above.

For multi-attribute encoding, the point cloud geometry is projected from 3D space to 2D space as before. Essentially, the depth (coordinate of a point along the projection direction) is stored in multiple depth layers in the multiple geometry video frames. The other two coordinates of the points are implicitly coded as the 2D position of the point in the multiple geometry video frames. Additionally, a separate set of attribute video frames are used for every attribute. For example, the patch generation block 504 and the frame packing block 512 in the encoder generates multiple sets (n-sets) of attribute frames $818_0$ to $818_{N-1}$, one set for each different type of attribute associated with the geometry points in the set of geometry frames 514. The compression and multiplexing occur similarly as discussed with regard to FIG. 5 and the encoded bitstream 825 for the multi-attribute 3D point cloud data is generated.

Using these encoding techniques, these is a correspondence in the 2D location of the geometry and the attributes across the multitude of geometry and attribute frames for every projected point. As a result, based on an assumption that there are no duplicate points in the source (uncompressed) point cloud, the geometry associated with each point in the point cloud is unique. Therefore, the decoder 600 can handle the duplicate points using the geometry information alone in geometry frames 514 to detect duplication of points during the reconstruction of the point cloud from the uncompressed and decoded bitstream. Consequently, decoder 600 can use a similar technique for handling the duplication of points as described with regard to FIGS. 6 and 7.

Figure 9:
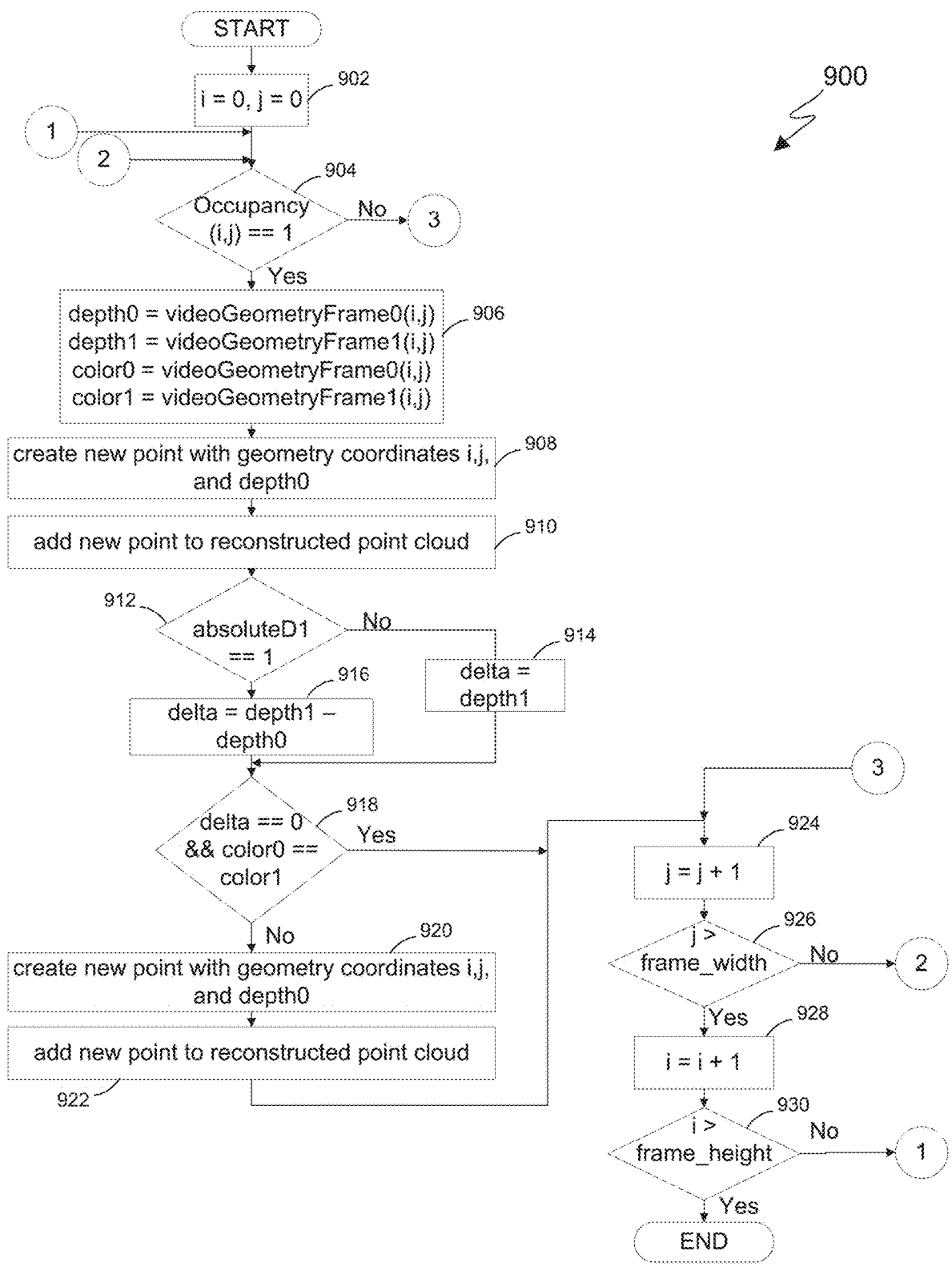
FIG. 9 illustrates a flowchart for a duplicate point removal process based on geometry and attributes in accordance with various embodiments of the present disclosure.

FIG. 9 illustrates a flowchart for a duplicate point removal process 900 based on geometry and attributes in accordance with various embodiments of the present disclosure. For example, the process depicted in FIG. 9 may be performed by the server 200 in FIG. 2 or the electronic device 300 in FIG. 3 or the geometry reconstruction blocks 530 and/or 614 in FIGS. 5 and 6, respectively, generally referred to here as the system.

In various embodiments, for example, with in applications which define duplicate points as having the same geometry and attributes, comparing just the geometry is not sufficient to determine that points are duplicative. In these embodiments, both the geometry and attributes are compared to determine duplicate points. In FIG. 8, color is used as an example, but any other attribute or multiple attributes could be used in connection with geometry to determine if a point is duplicative. Also, as discussed above, any number of layers may be used instead of two.

The system begins by starting with the first pixel (i=0, j=0) in the geometry frame (step 902). If occupied (step 904) (e.g., based on an occupancy map), the system looks to the values in two geometry frames and the two color frames (step 906), creates a new point (step 908) and adds the point to the reconstructed point cloud (step 910) for the first depth layer (D0).

If the flag "absolute D1"==1 is set (at step 912), the depth delta is calculated as the value for depth1-depth0 (step 916) and if not greater than zero and the color values are the same (step 918) (or in some embodiments within a set threshold of zero/similarity), the system identifies the point as geometry duplicative and color duplicative and removes the point (or ignores/does not include/create) from the point cloud as the system looks to the next width pixel (i.e., j=j+1) (step 924). If, however, the point is not both geometry and color duplicative, the system creates the new point and adds the new point to the reconstructed point cloud for the second depth (d1) layer (steps 920 and 922) similarly as done for the point for the first depth (d0) layer as discussed above.

For flag "absolute D1"==1 not set (at step 912), the delta is the value stored for the pixel and if not greater than zero and the color values are the same (step 918) (or in some embodiments within a set threshold of zero/similarity), the system identifies the point as geometry duplicative and color duplicative and removes the point (or ignores/does not include/create) from the point cloud as the system looks to the next width pixel (i.e., j=j+1) (step 724). If, however, the point is not both geometry and color duplicative, the system creates the new point and adds the new point to the reconstructed point cloud for the second depth (d1) layer (steps 920 and 922) similarly as done for the point for the first depth (d0) layer as discussed above. Thereafter, the system continues the process for all frame width coordinates j (steps 924 and 926) and then all frame height coordinates i (Steps 928 and 930), until the entirety of the set of frames have been processed.

In another embodiment, the projected points are correlated grouped in the form of patches before storing into video frames. Therefore, during the reconstruction of the point cloud from the decoded geometry frame, the points are retrieved from the geometry and attribute frames in a patch-by-patch fashion. The checking for duplication needs to be also be done patch-by-patch. Pseudo code for this is provided below and Table 2 lists the variables used in the pseudo code, and the pseudo code itself is shown below.

Example pseudo code for an embodiment to compare geometry and attribute information for preventing duplication of points when the 2D points are grouped into correlated patches before storing into corresponding frames:

```
for( p = 0; p <= patch_count_minus1; p++ ) {
  patch = patches[p]
  for ( v0 = 0; v0 < patch.sizeV0; v0++ ) {
    for ( u0 = 0; u0 < patch.sizeU0; u0++ ) {
      for ( v1 = 0; v1 < occupancyResolution; v1++ ) {
        v = v0 * occupancyResolution + v1;
        for ( u1 = 0; u1 < occupancyResolution; u1++ ) {
          u = u0 * occupancyResolution + u1;
          x = patch.u0 * occupancyResolution + u;
          y = patch.v0 * occupancyResolution + v;
          occupancy = oFrame[x][y]
          if (occupancy == 1){
            depth0 = gFrame[0][0][x][y];
            point0[patch.normalAxis] = depth0 + patch.d1
            point0[patch.tangentAxis] = u + patch.u1;
            point0[patch.bitangentAxis] = v + patch.v1;
            recPc.addPoint(point0) // add the first point to the
            reconstructed point cloud
            for ( t=0; t < attribute_count; t++) {
              redPc.setAttribute(aFrame[0][t][x][y]) // add
              attributes to the first point
            }
            if (geometry_absolute_coding_enabled_flag == 1){
              for ( l = 1; l <= layer_count_minu1; l++) {
                depthl = gFrame[l][0][x][y];
                delta = depth0 - depthl;
                unique_attributes = compare_attributes(aFrame, x, y);
                if ((delta > 0) && (unique_attributes == True)){
                  pointl[patch.normalAxis] = depthl + patch.d1
                  pointl[patch.tangentAxis] = u + patch.u1;
                  pointl[patch.bitangentAxis] = v + patch.v1;
                  recPc.addPoint(pointl) // add the point from level 1
          to the reconstructed point cloud
                  for ( t=0; t < attribute_count; t++) {
                    redPc.setAttribute(aFrame[l][t][x][y]) // add
          attributes to the point from lth level
                  }
                }
              }
            }
            else { // geometry_absolute_coding_enabled_flag is 0
              for ( l = 1; l <= layer_count_minu1; l++) {
                depthl = gFrame[l][0][x][y];
                delta = depthl;
                if (delta > 0){
                  pointl[patch.normalAxis] = depthl + patch.d1
                  pointl[patch.tangentAxis] = u + patch.u1;
                  pointl[patch.bitangentAxis] = v + patch.v1;
                  recPc.addPoint(pointl) // add the point from level 1
          to the reconstructed point cloud
                }
              }
            }
          }
        }
      }
    }
  }
}
```

```
    }
  }
}
```

TABLE 1

Explanation of variables in the example pseudocode provided above for the embodiment to compare geometry and attribute information for preventing duplication of points when the 2D points are grouped into correlated patches before storing into corresponding frames.

| | |
|---|---|
| layer_count_minus1 | the number of layers for encoding the geometry or attribute information |
| patch_count_minus1 | the number of patches in the geometry (or attribute) frame |
| geometry_absolute_coding_enabled_flag | flag to indicate absolute d1 coding is enabled or not |
| gFrame | the decode geometry frame |
| oFrame | the decoded occupancy map frame |
| recPc | point cloud reconstructed from the decoded geometry and attribute information |
| occupancyResolution | the minimum unit of block (or grid) size in the video frame that belongs to a unique patch. In other words, pixels from two different blocks cannot occupy the same occupancyResolution x occupancyResolution block |
| aFrame | the decoded attribute frame |
| attribute_count | indicates the number of attributes (excluding the geometry) associated with the point cloud |

In another embodiment, the geometry coordinates are repeated as many times as there are attributes in the source (multi-attribute) point cloud. In other words, there is an inherent duplication of the geometry coordinates, which represent the same position in the 3D space, in the source (uncompressed) point cloud. For such type of point clouds, the determination as to whether a given reconstructed point is a duplicate point or not cannot be made solely based on comparing the geometry information. Instead, both the geometry and the associated set of colors (and other attributes, if present) is used to determine whether a point is a duplicate of a pervious point or not.

In one embodiment, the number of depth layers ("d" in FIG. 8) may be restricted to two similar to the previous illustrative examples. In such a scenario, the same 3D point (with different attributes) may be encoded in separate patches. In another embodiment, the number of depth layers ("d" in FIG. 8) may be greater than or equal to the number of attributes (i.e., the number of geometry duplication in the source point cloud). Even for such embodiments, it is possible for the same 3D point (with different attributes) to be encoded in separate patches. Therefore, in both these embodiments, it is quite likely that all the points with potentially the same geometry coordinates and/or attribute values are not available for comparison (for computing "delta") at the same time. As a result, first a mapping data structure (such as a dictionary) is used to store geometry coordinate value and geometry frame information. For example, a unique hash is constructed from the reconstructed coordinate values and used a key to the dictionary, and the frame number from which the point was retrieved is stored in a list corresponding to the key in the dictionary. The size of the list corresponding to each key (which can be used to uniquely identify a 3D geometry coordinate) in the dictionary indicates the number of points sharing the same geometry coordinates. Following the reconstruction of all the geometry points, only those points are fetched (using the hash key) whose corresponding list size is greater than the number of attributes (indicating generation of duplicate points). Then, the attribute information is used to keep only the "n" most unique points.

In yet another embodiment, irrespective of the how the geometry and attributes of a multi-attribute point cloud is defined, the reconstructed point cloud contains multiple copies of the geometry with different attributes (originating from the multi-attribute nature of the point cloud). For such reconstructed point cloud, again, the decision as to whether a given reconstructed point is duplicate or not is made by comparing both the geometry and attributes.

As discussed above and reiterated herein, an exact similarity between compared geometry values and/or attribute values is not required to determine if the points in the reconstructed point cloud are duplicated or not. In some embodiments, points are to be duplicate if they are value close one another using an appropriate metric. For example, a point can be defined to be a duplicate of another point if the absolute delta (as discussed above) is less than some small threshold value and/or if the Euclidean distance computed for the attributes between the two points are less than a small threshold value. Such a strategy is especially useful when some floating-point attributes (e.g., reflectance, normal vectors, etc.) are also associated with each point in the point cloud.

In yet another embodiment, a single geometry video frame and a corresponding single attribute video frame are composed from the two depth layers per point cloud frame. Several interpolation techniques may be used to convert the two depth layers into a single video geometry frame. In one embodiment, the decoded geometry frame includes a single frame per point cloud and the decoded attribute frame contains a single frame per point cloud. The single geometry layer contains interleaved pixels from the near and far layers of geometry, and the single attribute layer contains interleaved pixels from the near and far layers of attribute. The interleaved (geometry or attribute) frame is formed by taking one pixel from the near layer and next from the far layer. For example, at a pixel (x, y), if (x+y) is even, value from the near layer is used and when (x+y) is odd, value from the far layer is used.

Two points are generated per pixel position if the occupancy value at that pixel is 1, one from the near layer and one from the far layer. Since the interleaved frame contains information from only one of the two layers, the missing layer value is predicted by interpolating the neighbors. When (x+y) is even, value of the near layer is available, and value of the far layer is interpolated. Similarly, when (x+y) is odd, value of the far layer is available, and value of the near layer is interpolated. In such embodiments, duplication is avoided at the encoder due to copying the depth value of a 3D point into multiple depth layers. However, duplication of geometry points and/or attribute values may be caused as a result of both lossy coding and/or pixel interpolation and extrapolation (prediction). The handling of duplication of points in the final reconstructed point cloud follows the process discussed above with regard to FIGS. 5-7. More specifically, after the geometry and/or attribute values are derived, either for the first layer or for the second layer, the predicted geometry and/or attribute values are compared against the corresponding geometry and/or attribute value of the point at the same 2D pixel location directly obtained from the decoded geometry and/or attribute video frame. If a possible duplication is detected, that is, if the geometry and/or attribute values of the predicted (extrapolated) point is exactly equal to, or within a certain threshold of the corresponding geometry and/or attribute values of the directly obtained point, then the predicted point is not added to the reconstructed point cloud.

Various embodiments of the present disclosure may be applied to the encoding and decoding of polygonal meshes (or "meshes"). Like point clouds, meshes may be used to represent virtual 3D objects. And like point clouds, most mesh files also contain a list of vertices and attributes. Additionally, most mesh files also contain a list of faces and edges that are used for generating piece-wise continuous surfaces. Embodiments of the present discus lure may be used to handle duplicate vertices in connection with any mesh compression algorithm that employs depth-layers based techniques, such as MPEG V-PCC, in order to leverage matured 2D image/video compression technologies.

Figure 10:
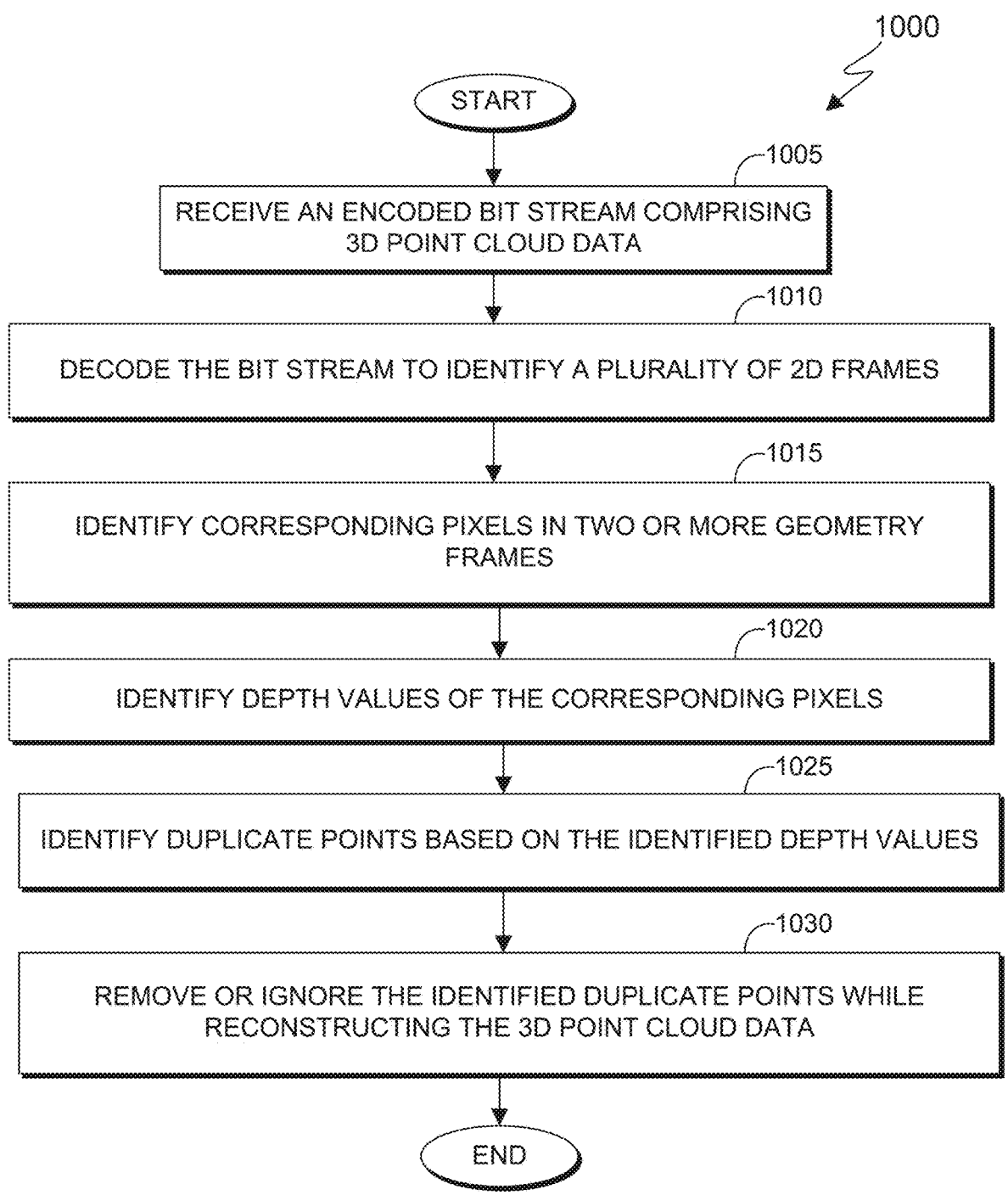
FIG. 10 illustrates a flowchart of a process for decoding 3D point cloud data in accordance with various embodiments of the present disclosure.

FIG. 10 illustrates a flowchart of a process 1000 for decoding 3D point cloud data in accordance with various embodiments of the present disclosure. For example, the process depicted in FIG. 10 may be performed by the server 200 in FIG. 2 or the electronic device 300 in FIG. 3 or the geometry reconstruction blocks 530 and/or 614 in FIGS. 5 and 6, respectively, generally referred to here as the system.

The process begins with the system receiving an encoded bit stream comprising the 3D point cloud data (step 1005). For example, in step 1005, the 3D point cloud data may be compressed 2D frames and metadata, where the frames are encoded to contain the 3D point cloud data. Thereafter, the system decodes the bit stream to identify a plurality of 2D frames (step 1010). For example, in step 1010, the system may decompress and separate out the compressed frames and metadata as discussed above.

The system then identifies corresponding pixels in two or more geometry frames (step 1015). For example, in step 1015, the system may identify the corresponding pixels based on locations of the corresponding pixels in the two or more 2D geometry frames from the plurality of 2D frames. For example, the corresponding pixels may have same i,j pixel coordinate values between the frames for different depths or layers. In some embodiments, the system may use an occupancy map to identify the corresponding pixels. Thereafter, the system identifies depth values of the corresponding pixels (step 1020). For example, in step 1020, the system may read the values that is encoded at the i,j coordinate location in the two or more geometry frames.

The system then identifies duplicate points based on the identified depth values (step 1025). For example, in step 1025, the system may identify the duplicate points based on the based on the identified depth values of the corresponding pixels in the two or more geometry frames being the same or similar. In one example for if actual (or absolute) depth values are encoded, the system may identify, in a first of the two or more geometry frames, a first depth value for a first of the corresponding pixels, then compare that value with a second depth value, from a second of the two or more geometry frames, for a second of the corresponding pixels. The system then determines that a point represented by the second pixel in the second geometry frame is a duplicate point if the compared depth values are the same or within the threshold value of each other. Here, the depth values indicate depths of points in the 3D point cloud from a plane the points are projected onto and are encoded as actual depth values or actual depth values minus an offset in the locations of the corresponding pixels in the geometry frames. In another example for if delta values are encoded, the system may determine whether a depth value for a second of the corresponding pixels in a second of the two or more geometry frames is zero or below a threshold value. If so, the system determines the point represented by the second pixel in the second geometry frame a duplicate point. Here, the depth values indicate depths of points in the 3D point cloud from a plane the points are projected onto and, for the second geometry frame, are encoded as delta values relative to the first geometry frame (potentially with an offset).

Additionally, in various embodiments, the system may use texture or attribute values in addition to geometry values to determine whether points are duplicative. The system may determine based on the depth values of the corresponding pixels that pixels in a second of the two or more geometry frames are geometry duplicative as discussed above. Additionally, the system may determine whether one or more second texture values respectively corresponding to the one or more geometry duplicative second pixels are texture duplicative of one or more first texture values respectively corresponding to the one or more first pixels. If so, the system determines that points are texture duplicative; and if both geometry and texture duplicative, determining that the point is duplicative points. For example, each of the identified duplicate points has a geometry indicated by the two or more geometry frames and one or more attributes indicated one or more sets of attribute frames, and the system identifies the duplicate points based on the two or more geometry frames and the one or more sets of attribute frames.

Thereafter, the system removes or ignores the identified duplicate points while reconstructing the 3D point cloud data (step 1030). For example, in step 1030, the system may not create, remove, or not add the duplicate point to the point cloud in generating one or more 3D objects.

In various embodiments, whether duplicate points are not added may depend on a type of application for reconstructing the 3D point cloud. For example, the system may remove or ignore the identified duplicate points while reconstructing the 3D point cloud data for a type of application that is not view dependent but use at least some of the identified duplicate points while reconstructing the 3D point cloud data for a type of application that is view dependent. For example, view dependent applications, such as 6DoF applications, allow for objects to be seen from various viewpoints (e.g., AR/VR applications where the user can "walk around" in the scene). In such cases, additional attributes may be needed for viewing of the points from different angle (e.g., view dependent color or reflectance, etc.). In these embodiments, the system may identify a type of application for reconstructing the 3D point cloud (i.e., view dependent or not) and remove or ignore points that are geometry duplicative but not texture (or attribute) duplicative for view dependent applications. For applications that are not view dependent, the system removes or ignores any points that are geometry duplicative including those that may not be texture (or attribute) duplicative while reconstructing the 3D point cloud data.

Although FIGS. 7, 9, and 10 illustrate examples of processes for duplicate point removal or decoding 3D point cloud data, various changes could be made to FIGS. 7, 9, and 10. For example, while shown as a series of steps, various steps in each figure could overlap, occur in parallel, occur in a different order, or occur multiple times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoder for decoding three-dimensional (3D) point cloud data, the decoder comprising:
 a communication interface configured to receive an encoded bit stream comprising the 3D point cloud data; and
 a processor configured to:
  decode the bit stream to identify a plurality of two dimensional (2D) frames;
  identify corresponding pixels in two or more geometry frames in the plurality of 2D frames based on locations of the corresponding pixels in the two or more geometry frames;
  identify depth values of the corresponding pixels in the two or more geometry frames;
  identify duplicate points in at least one of the two or more geometry frames based on the identified depth values of the corresponding pixels in the two or more geometry frames; and
  remove or ignore the identified duplicate points while reconstructing the 3D point cloud data.

2. The decoder of claim 1, wherein to identify the duplicate points in at least one of the two or more geometry frames based on the identified depth values, the processor is further configured to:
 identify, in a first of the two or more geometry frames, a first depth value for a first of the corresponding pixels;
 identify, in a second of the two or more geometry frames, a second depth value for a second of the corresponding pixels, the first and second pixels having corresponding locations in their respective geometry frames;
 compare the identified first and second depth values to determine whether the identified first and second depth values are the same or within a threshold value of each other; and
 determine that a point represented by the second pixel in the second geometry frame is one of the duplicate points based on determining that the first and second depth values are the same or within the threshold value of each other.

3. The decoder of claim 1, wherein to identify the duplicate points in at least one of the two or more geometry frames based on the identified depth values, the processor is further configured to:
 identify, in a first of the two or more geometry frames, a first depth value for a first of the corresponding pixels;
 determine whether a second depth value for a second of the corresponding pixels in a second of the two or more geometry frames is zero or below a threshold value, the first and second pixels having corresponding locations in their respective geometry frames; and
 determine that a point represented by the second pixel in the second geometry frame is one of the duplicate points based on determining that the second depth value is zero or below the threshold value,
 wherein the depth values indicate depths of points in the 3D point cloud from a plane the points are projected onto and, for the second geometry frame, are encoded as delta values relative to the first geometry frame.

4. The decoder of claim 1, wherein to identify the duplicate points in at least one of the two or more geometry frames based on the identified depth values, the processor is further configured to:
 determine based on the depth values of the corresponding pixels in the two or more geometry frames that one or more second pixels of the corresponding pixels in a second of the two or more geometry frames are geometry duplicative of one or more first pixels of the corresponding pixels in a first of the two or more geometry frames;
 based on determining that the one or more second pixels are geometry duplicative, determine whether one or more second texture values respectively corresponding to the one or more geometry duplicative second pixels are texture duplicative of one or more first texture values respectively corresponding to the one or more first pixels; and
 based on determining that at least one of the one or more second pixels are both geometry and texture duplicative of at least one of the one or more first pixels, determine that a point represented by the at least one second pixel is one of the duplicate points,
 wherein the first and second texture values are identified from first and second texture frames, respectively, in the plurality of 2D frames and first and second texture frames respectively correspond to the first and second geometry frames.

5. The decoder of claim 1, wherein:
 the processor is further configured to identify a type of application for reconstructing the 3D point cloud;
 wherein to remove or ignore the identified duplicate points while reconstructing the 3D point cloud data, the processor is further configured to remove or ignore the identified duplicate points while reconstructing the 3D point cloud data for the type of application that is not view dependent, and the processor is further configured to use at least some of the identified duplicate points while reconstructing the 3D point cloud data for the type of application that is view dependent.

6. The decoder of claim 1, wherein:

the processor is further configured to identify a type of application for reconstructing the 3D point cloud, wherein the identified duplicate points are geometry duplicative and at least some of the identified duplicate points are geometry duplicative but not texture duplicative, to remove or ignore the identified duplicate points while reconstructing the 3D point cloud data, the processor is further configured to remove or ignore all of the identified duplicate points while reconstructing the 3D point cloud data for the type of application that is not view dependent, and the processor is further configured to use the at least some of the identified duplicate points are geometry duplicative but not texture duplicative while reconstructing the 3D point cloud data for the type of application that is view dependent.

7. The decoder of claim 1, wherein:

each of the identified duplicate points has a geometry indicated by the two or more geometry frames and one or more attributes indicated one or more sets of attribute frames, and to identify the duplicate points, the processor is further configured to identify the duplicate points based on the two or more geometry frames and the one or more sets of attribute frames.

8. An encoder for encoding three-dimensional (3D) point cloud data, the encoder comprising:

a processor configured to:
encode a first set of two dimensional (2D) frames for the 3D point cloud data into an encoded bitstream; and
perform prediction on the first set of 2D frames to encode a second set of 2D frames for the 3D point cloud data into the encoded bitstream, wherein to perform the prediction the processor is further configured to:
decode the bit stream to generate a plurality of 2D frames;
identify corresponding pixels in two or more geometry frames in the plurality of 2D frames based on locations of the corresponding pixels in the two or more geometry frames;
identify depth values of the corresponding pixels in the two or more geometry frames;
identify duplicate points in at least one of the two or more geometry frames based on the identified depth values of the corresponding pixels in the two or more geometry frames; and
remove or ignore the identified duplicate points while reconstructing the 3D point cloud data; and
a communication interface configured to transmit the encoded bit stream comprising the 3D point cloud data.

9. The encoder of claim 8, wherein to identify the duplicate points in at least one of the two or more geometry frames based on the identified depth values, the processor is further configured to:

identify, in a first of the two or more geometry frames, a first depth value for a first of the corresponding pixels;
identify, in a second of the two or more geometry frames, a second depth value for a second of the corresponding pixels, the first and second pixels having corresponding locations in their respective geometry frames;
compare the identified first and second depth values to determine whether the identified first and second depth values are the same or within a threshold value of each other; and
determine that a point represented by the second pixel in the second geometry frame is one of the duplicate points based on determining that the first and second depth values are the same or within the threshold value of each other.

10. The encoder of claim 8, wherein to identify the duplicate points in at least one of the two or more geometry frames based on the identified depth values, the processor is further configured to:

identify, in a first of the two or more geometry frames, a first depth value for a first of the corresponding pixels;
determine whether a second depth value for a second of the corresponding pixels in a second of the two or more geometry frames is zero or below a threshold value, the first and second pixels having corresponding locations in their respective geometry frames; and
determine that a point represented by the second pixel in the second geometry frame is one of the duplicate points based on determining that the second depth value is zero or below the threshold value,
wherein the depth values indicate depths of points in the 3D point cloud from a plane the points are projected onto and, for the second geometry frame, are encoded as delta values relative to the first geometry frame.

11. The encoder of claim 8, wherein to identify the duplicate points in at least one of the two or more geometry frames based on the identified depth values, the processor is further configured to:

determine based on the depth values of the corresponding pixels in the two or more geometry frames that one or more second pixels of the corresponding pixels in a second of the two or more geometry frames are geometry duplicative of one or more first pixels of the corresponding pixels in a first of the two or more geometry frames;
based on determining that the one or more second pixels are geometry duplicative, determine whether one or more second texture values respectively corresponding to the one or more geometry duplicative second pixels are texture duplicative of one or more first texture values respectively corresponding to the one or more first pixels; and
based on determining that at least one of the one or more second pixels are both geometry and texture duplicative of at least one of the one or more first pixels, determine that a point represented by the at least one second pixel is one of the duplicate points,
wherein the first and second texture values are identified from first and second texture frames, respectively, in the plurality of 2D frames and first and second texture frames respectively correspond to the first and second geometry frames.

12. The encoder of claim 8, wherein:

the processor is further configured to identify a type of application for reconstructing the 3D point cloud;
wherein to remove or ignore the identified duplicate points while reconstructing the 3D point cloud data, the processor is further configured to remove or ignore the identified duplicate points while reconstructing the 3D point cloud data for the type of application that is not view dependent, and the processor is further configured to use at least some of the identified duplicate points while reconstructing the 3D point cloud data for the type of application that is view dependent.

13. The encoder of claim 8, wherein:

the processor is further configured to identify a type of application for reconstructing the 3D point cloud, wherein the identified duplicate points are geometry duplicative and at least some of the identified duplicate points are geometry duplicative but not texture duplicative, to remove or ignore the identified duplicate points while reconstructing the 3D point cloud data, the processor is further configured to remove or ignore all of the identified duplicate points while reconstructing the 3D point cloud data for the type of application that is not view dependent, and the processor is further configured to use the at least some of the identified duplicate points are geometry duplicative but not texture duplicative while reconstructing the 3D point cloud data for the type of application that is view dependent.

14. A method for decoding three-dimensional (3D) point cloud data, the method comprising:

receiving an encoded bit stream comprising the 3D point cloud data;

decoding the bit stream to identify a plurality of two dimensional (2D) frames;

identifying corresponding pixels in two or more geometry frames in the plurality of 2D frames based on locations of the corresponding pixels in the two or more geometry frames;

identifying depth values of the corresponding pixels in the two or more geometry frames;

identifying duplicate points in at least one of the two or more geometry frames based on the identified depth values of the corresponding pixels in the two or more geometry frames; and removing or ignoring the identified duplicate points while reconstructing the 3D point cloud data.

15. The method of claim 14, wherein identifying the duplicate points in at least one of the two or more geometry frames based on the identified depth values comprises:

identifying, in a first of the two or more geometry frames, a first depth value for a first of the corresponding pixels;

identifying, in a second of the two or more geometry frames, a second depth value for a second of the corresponding pixels, the first and second pixels having corresponding locations in their respective geometry frames;

comparing the identified first and second depth values to determine whether the identified first and second depth values are the same or within a threshold value of each other; and determining that a point represented by the second pixel in the second geometry frame is one of the duplicate points based on determining that the first and second depth values are the same or within the threshold value of each other.

16. The method of claim 14, wherein identifying duplicate points in at least one of the two or more geometry frames based on the identified depth values comprises:

identifying, in a first of the two or more geometry frames, a first depth value for a first of the corresponding pixels;

determining whether a second depth value for a second of the corresponding pixels in a second of the two or more geometry frames is zero or below a threshold value, the first and second pixels having corresponding locations in their respective geometry frames; and determining that a point represented by the second pixel in the second geometry frame is one of the duplicate points based on determining that the second depth value is zero or below the threshold value, wherein the depth values indicate depths of points in the 3D point cloud from a plane the points are projected onto and, for the second geometry frame, are encoded as delta values relative to the first geometry frame.

17. The method of claim 14, wherein identifying duplicate points in at least one of the two or more geometry frames based on the identified depth values comprises:

determining based on the depth values of the corresponding pixels in the two or more geometry frames that one or more second pixels of the corresponding pixels in a second of the two or more geometry frames are geometry duplicative of one or more first pixels of the corresponding pixels in a first of the two or more geometry frames;

based on determining that the one or more second pixels are geometry duplicative, determining whether one or more second texture values respectively corresponding to the one or more geometry duplicative second pixels are texture duplicative of one or more first texture values respectively corresponding to the one or more first pixels; and based on determining that at least one of the one or more second pixels are both geometry and texture duplicative of at least one of the one or more first pixels, determining that a point represented by the at least one second pixel is one of the duplicate points, wherein the first and second texture values are identified from first and second texture frames, respectively, in the plurality of 2D frames and first and second texture frames respectively correspond to the first and second geometry frames.

18. The method of claim 14 further comprising:

identifying a type of application for reconstructing the 3D point cloud;

wherein removing or ignoring the identified duplicate points while reconstructing the 3D point cloud data comprises removing or ignoring the identified duplicate points while reconstructing the 3D point cloud data for the type of application that is not view dependent, and wherein the method further comprises using at least some of the identified duplicate points while reconstructing the 3D point cloud data for the type of application that is view dependent.

19. The method of claim 14 further comprising:

identifying a type of application for reconstructing the 3D point cloud;

wherein the identified duplicate points are geometry duplicative and at least some of the identified duplicate points are geometry duplicative but not texture duplicative, wherein removing or ignoring the identified duplicate points while reconstructing the 3D point cloud data comprises removing or ignoring all of the identified duplicate points while reconstructing the 3D point cloud data for the type of application that is not view dependent, and wherein the method further comprises using the at least some of the identified duplicate points are geometry duplicative but not texture duplicative while reconstructing the 3D point cloud data for the type of application that is view dependent.

20. The method of claim 14, wherein:

each of the identified duplicate points has a geometry indicated by the two or more geometry frames and one or more attributes indicated one or more sets of attribute frames, and identifying the duplicate points comprises identifying the duplicate points based on the two or more geometry frames and the one or more sets of attribute frames.

\* \* \* \* \*

UNITED STATES PATENT AND TRADEMARK OFFICE
CERTIFICATE OF CORRECTION

PATENT NO. : 10,783,668 B2
APPLICATION NO. : 16/219433
DATED : September 22, 2020
INVENTOR(S) : Sinharoy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 78 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*